(12) United States Patent
Gandola et al.

(10) Patent No.: US 9,700,016 B2
(45) Date of Patent: Jul. 11, 2017

(54) ANIMAL MARKING DEVICES, TRANSFER ASSEMBLIES, AND USEFUL RESTRAINTS

(71) Applicant: Somark Innovations, Inc., San Diego, CA (US)

(72) Inventors: Kent Raphael Gandola, San Diego, CA (US); George Albert Mansfield, III, San Diego, CA (US); Mark Erik Pendleton, Oceanside, CA (US); Gerald Paul Sanders, III, Oceanside, CA (US); Eric Edwin Barnes, Encinitas, CA (US)

(73) Assignee: SOMARK INNOVATIONS, INC., San Diego, CA (US)

( * ) Notice: Subject to any disclaimer, the term of this patent is extended or adjusted under 35 U.S.C. 154(b) by 1019 days.

(21) Appl. No.: 13/869,883

(22) Filed: Apr. 24, 2013

(65) Prior Publication Data
US 2014/0128880 A1   May 8, 2014

Related U.S. Application Data

(60) Provisional application No. 61/637,767, filed on Apr. 24, 2012.

(51) Int. Cl.
*A61B 17/00* (2006.01)
*A61D 1/04* (2006.01)
(Continued)

(52) U.S. Cl.
CPC ............ *A01K 11/005* (2013.01); *A01K 1/031* (2013.01); *A01K 1/0613* (2013.01); *A01K 11/00* (2013.01); *A01K 11/006* (2013.01)

(58) Field of Classification Search
CPC .... A01K 11/005; A01K 11/006; A01K 1/031; A01K 1/0613; A01K 11/00;
(Continued)

(56) References Cited

U.S. PATENT DOCUMENTS 4,254,767 A * 3/1981 Mixon, Jr. ............ A61D 3/00
                                                              128/869
4,392,493 A 7/1983 Niemeijer
(Continued)

FOREIGN PATENT DOCUMENTS

CN     101057561 A    10/2004
CN       1547430 A    11/2004
(Continued)

OTHER PUBLICATIONS

CN Application No. 201080049308.5 Office Action Dated Oct. 30, 2013.
(Continued)

*Primary Examiner* — Anh Dang
(74) *Attorney, Agent, or Firm* — Christensen, Fonder, Dardi & Herbert PLLC

(57) ABSTRACT

Described herein is a marking system for marking animals. The marking system may include a restraining device, a controller, and a marking device. The marking device includes a marking needle of fixed length comprising one or a plurality of needle tips; the restraining device is sized and configured for restraining an animal or animal body part thereof and oriented such that the marking device can make a mark on a substrate portion of the animal body part; and the controller is configured to control the position of the marking device and to make a mark on the substrate portion of the animal body part. Also described herein are media transfer assemblies for use in the disclosed marking system.

23 Claims, 57 Drawing Sheets

(51) Int. Cl.
*A01K 11/00* (2006.01)
*A01K 1/03* (2006.01)
*A01K 1/06* (2006.01)

(58) Field of Classification Search
CPC .......... A61M 37/0015; A61M 37/0076; A61M 37/0084; A61M 2037/0023; A61M 2037/003; A61M 2037/0038; A61M 2037/0046; A61M 2037/0053; A61M 2037/0061; A61F 2/10; A01B 17/3468
See application file for complete search history.

(56) References Cited

U.S. PATENT DOCUMENTS

| | | | | |
|---|---|---|---|---|
| 4,440,078 | A | * | 4/1984 | McCrery, Jr. ........ A01K 11/005 101/26 |
| 6,013,122 | A | * | 1/2000 | Klitzman ................ A61K 8/14 106/31.03 |
| 6,263,762 | B1 | | 7/2001 | Zeitler et al. |
| 6,901,885 | B1 | | 6/2005 | Kleinsasser |
| 7,098,394 | B2 | | 8/2006 | Armer et al. |
| 9,253,963 | B2 | * | 2/2016 | Mays .................... A01K 11/00 |
| 2003/0062988 | A1 | | 4/2003 | Mandecki et al. |
| 2004/0131234 | A1 | | 7/2004 | Long |
| 2004/0144333 | A1 | | 7/2004 | Finlayson |
| 2004/0220527 | A1 | | 11/2004 | Buckley et al. |
| 2006/0177649 | A1 | | 8/2006 | Clark et al. |
| 2008/0036846 | A1 | | 2/2008 | Hopkins et al. |
| 2008/0247637 | A1 | | 10/2008 | Gildenberg |
| 2009/0311295 | A1 | | 12/2009 | Mathiowitz et al. |
| 2010/0295682 | A1 | | 11/2010 | August et al. |
| 2011/0077659 | A1 | | 3/2011 | Mandecki et al. |
| 2012/0226288 | A1 | | 9/2012 | Mays et al. |
| 2016/0037749 | A1 | | 2/2016 | Gandola et al. |

FOREIGN PATENT DOCUMENTS

| | | |
|---|---|---|
| EP | 0300110 A2 | 1/1989 |
| EP | 1911347 A1 | 4/2008 |
| EP | 2840890 | 3/2015 |
| WO | WO02082892 | 10/2002 |
| WO | WO2011028926 | 3/2011 |
| WO | WO-2011028926 A3 | 7/2011 |
| WO | WO 2013/163339 | 10/2013 |
| WO | WO2013163339 | 10/2013 |
| WO | WO-2014151852 A1 | 9/2014 |

OTHER PUBLICATIONS

PCT/US2010/047712 International Preliminary Report on Patentability and Written opinion dated Mar. 6, 2012.
PCT/US2010/047712International Search Report dated May 30, 2011.
PCT/US2013/038055 International Search Report dated Aug. 23, 2013.
PCT/US2013/038055 IPRP dated Oct. 28, 2014.
U.S. Appl. No. 13/393,912 Restriction Requirement dated Oct. 31, 2014.
European Patent Application No. 13782068.4 Extended European Search Report dated Nov. 26, 2015.
PCT Patent Application No. PCT/US2014/026563 International Preliminary Report on Patentability issued Sep. 15, 2015.
PCT Patent Application No. PCT/US2014/026563 International Search Report completed Jul. 18, 2014.
PCT Patent Application No. PCT/US2014/026563 Written Opinion completed Jul. 18, 2014.
Singapore Patent Application No. 11201507292V Written Opinion dated Jun. 2, 2016.

* cited by examiner

ANIMAL MARKING DEVICES, TRANSFER ASSEMBLIES, AND USEFUL RESTRAINTS

RELATED APPLICATIONS

This application claims the benefit of U.S. Provisional Patent Application No. 61/637,767, filed Apr. 24, 2012, the contents of which are incorporated by reference in their entirety.

FIELD OF THE INVENTION

The present disclosure relates to systems and methods for producing an identifying mark in an animal.

BACKGROUND

Animals are marked for identification in a variety of applications by a variety of methods. The ability to accurately identify and track individual animals is obligatory in research environments where animals are exposed to different experimental conditions, in the management of colonies of genetically modified animals for which multiple genotypes are present, and in breeding stocks where it is useful to track which animals possess certain desirable and undesirable traits.

To date, methods for identification have largely been dominated by ear punching, ear notching, ear tagging, toe clipping, and manual tail tattooing. The inherent limitations of these methods are becoming increasingly well publicized, and compromise the ability to accurately track animals as colonies become larger and more complex.

SUMMARY OF DISCLOSURE

The present disclosure is directed to a marking system for marking an animal body part. The marking system may include at least one restraining device, a controller, and a marking device. The restraining device may be sized and configured for restraining an animal or animal body part thereof and may be oriented such that the marking device can make a mark on a marking substrate of the animal body part. The controller may be configured to control the position of the marking device and to operate the marking device to make a mark on the marking substrate of the animal body part. The marking device may include a marking needle of fixed length comprising one or a plurality of needle tips. Optionally, the animal is a mouse, a rat, or a rodent; and optionally, the body part is a tail.

In one embodiment, the marking needle may be coupled to a needle cartridge. The needle cartridge may include a reference feature configured to position the needle cartridge on the marking device with precision. Further, the needle cartridge may include a locking feature configured to lock the needle cartridge onto the marking device.

In one embodiment, the marking needle may be coupled to the needle cartridge by means of an adhesive. In another embodiment, the marking needle may be coupled to the needle cartridge by molding the marking needle to the needle cartridge. In a refinement, the needle cartridge may be molded from a polymer material.

In one embodiment, the marking needle may include multiple co-planar tips having a tip length deviation of no more than about ±0.001" (±25 microns) and a tip concentration deviation of no more than about ±0.005" (±125 microns).

In one embodiment, the needle cartridge is permanently affixed to the marking device. In another embodiment, the needle cartridge is removable to allow replacement of worn or damaged needles. In a further embodiment, the marking device comprises multiple needle cartridges dimensioned to account for differences in animal substrate size or geometry. The multiple needle cartridges may be pre-mounted onto the marking device, and the marking system may be configured to automatically mount and dismount the marking needle.

In one embodiment, the needle tips may be configured to penetrate the epidermis of the marking substrate and transfer a pigment into the dermis of the marking substrate. In a refinement, the pigment may be deposited into a marking substrate of a young mouse at a depth of about 150-250 microns. In another refinement, the pigment may be deposited into a marking substrate of an adult mouse at a depth of about 200-300 microns. In a further refinement, the pigment may be deposited into a marking substrate of a mouse at a depth of about 200-250 microns.

In one embodiment, the restraining device may include a spring-loaded tapered v-groove configured to compensate for differences in size of the marking substrate. In a refinement, the spring-loaded tapered v-groove may be modulated to further compensate for differences in size of the substrate body part. The modulated spring-loaded tapered v-groove comprises a plurality of independent groove sections, each groove section being articulating and self-aligning. The spring-loaded tapered v-groove may be assembled in a support mount, and is optionally enclosed within a protective compliant boot.

In one embodiment, the marking system may be configured to select the length of the marking needle and the configuration of the restraining device based on the size of the marking substrate. To that end, the marking system may further include a measuring gauge configured to measure the size of the marking substrate. In a refinement, the measuring gauge comprising a plurality of measuring slots with incrementally increasing widths. In another refinement, the marking system may further include a measuring device configured to measure the size of the marking substrate by using a laser-generating device emitting a light curtain beam and a receiver that is incorporated into the measuring device.

In one embodiment, the marking system may further include a forked tool adapted to engage and compress the locking clip to facilitate removal of the needle cartridge from the marking device. In one refinement, the forked tool may be integrated with a measuring gauge comprising a plurality of measuring slots with incrementally increasing widths.

In one embodiment, the marking device may be operated by the controller to mark the marking substrate in a proximal to distal direction. In another embodiment, the marking device is operated by the controller to mark the marking substrate in a distal to proximal direction.

In one embodiment, the marking system may further include a media transfer assembly comprising a pigment, and the marking device is configured to make a mark by contacting the pigment prior to the marking substrate.

In one embodiment, the media transfer assembly may include a container defining one or more reservoirs for containing the pigment. The container may include upper and lower container walls sealed against each other to define the one or more reservoirs, and optionally, each of the upper and lower container walls comprise a polymer material.

In one embodiment, each of the upper and lower container walls may include a material having a water vapor transmission rate (WVTR) and oxygen transmission rate (OTR)

sufficient to prevent substantial water or air transmission through the upper and lower container walls. In a refinement, the WVTR of the material is from about 2.0 to about 6.0 gr/m²/24 hrs. In another refinement, the OTR of the material is from about 60 to about 9,660 cc/m²/24 hrs.

In one embodiment, the pigment may be contained within a single reservoir in the container, the single reservoir having formed edge features configured to limit pigment flow within the reservoir. In a refinement, the formed edge features include a plurality of scallops. In another refinement, the formed edge features include one or more baffles.

In one embodiment, the pigment may be contained within a plurality of reservoirs in the container. In a refinement, the plurality of reservoirs may be configured to be shared across tattoo characters to be applied to the substrate. In another refinement, each reservoir is configured to be dedicated to a discrete tattoo character to be applied to the substrate.

In one embodiment, each of the upper and lower container walls has an elongation modulus of from about 180% to about 600%. In another embodiment, each of the upper and lower container walls has a tensile strength of from about 4.0-6.8 lbs/in. In a refinement, at least one of the upper and lower container walls comprises a polymer selected from a low-to-mid density polyethylene, polyalkene or polyolefin type. In a further refinement, at least one of the upper and lower container walls has a thickness of about 0.003 inches +/− about 5%, about 10%, about 20%, or about 30%.

In one embodiment, the pigment may be supported on a pigment carrier selected from the group consisting of a matrix, and a solid support material. In a refinement, the pigment carrier is completely contained within the one or more reservoirs.

In one embodiment, the pigment carrier may be pigment-philic. In a refinement, the pigment carrier may include a lower portion that carries the pigment and an upper portion that is essentially free of the pigment. In another refinement, the pigment carrier comprises a pigment-philic coating.

In one embodiment, the one or more reservoirs are capable of withstanding an internal air pressure of at least 25 psi without rupturing. In another embodiment, the one or more reservoirs are capable of withstanding an external pressure of at least 20 psi without rupturing when filled with the pigment.

In one embodiment, the marking system may further include a rigid or semi-rigid frame configured to secure and support the container. In a refinement, the frame is made of a polymer material. In another refinement, the frame is made of a paper-based or cardstock material.

In one embodiment, the container is positioned between upper and lower halves of a rigid or semi-rigid frame. In a refinement, the container is affixed to the lower half of the rigid or semi-rigid frame. In another refinement, the container is affixed to the upper half of the rigid or semi-rigid frame.

In one embodiment, at least one of the reservoirs is filled with a cleaning solution adapted to clean the marking needle. In a refinement, the cleaning solution is aqueous based. In another refinement, the cleaning solution is isopropyl alcohol. In yet another refinement, the cleaning solution is tissue oil.

In one embodiment, the pigment is selected from the group consisting of: pigments that are black in the visible light spectrum of about 390-750 nm wavelength; pigments that are colored in the visible light spectrum of about 390-750 nm wavelength; pigments that are transparent in the visible light spectrum of about 390-750 nm wavelength, and are colored in the UV spectrum of about 10-400 nm wavelength; pigments that are colored in the visible light spectrum of about 390-750 nm wavelength, and are colored in the UV spectrum of about 10-400 nm wavelength; and pigments that are black in the visible light spectrum of about 390-750 nm wavelength, and are colored in the UV spectrum of about 10-400 nm wavelength.

In one embodiment, the pigment may have an average particle size in the range of between 1.0-10.0 microns, inclusive of agglomerates. In another embodiment, the pigment may be encapsulated in polymer microspheres. In a refinement, the polymer microspheres comprise poly(methyl 2-methylpropenoate) or poly(methyl methacrylate). In another refinement, the polymer microspheres have an average particle size in the range of between 1.0-10.0 microns, inclusive of agglomerates.

In one embodiment, the pigment-encapsulated polymer microspheres have an optical characteristic selected from: black in the visible light spectrum of about 390-750 nm wavelength; colored in the visible light spectrum of about 390-750 nm wavelength; transparent in the visible light spectrum of about 390-750 nm wavelength—and colored in the UV spectrum of about 10-400 nm wavelength; colored in the visible light spectrum of about 390-750 nm wavelength, and colored in the UV spectrum of about 10-400 nm wavelength; black in the visible light spectrum of about 390-750 nm wavelength, and colored in the UV spectrum of about 10-400 nm wavelength; and combinations thereof.

These and other aspects and features of the disclosure will be better understood upon reading the following detailed description in conjunction with the accompanying drawings.

Figure 1:
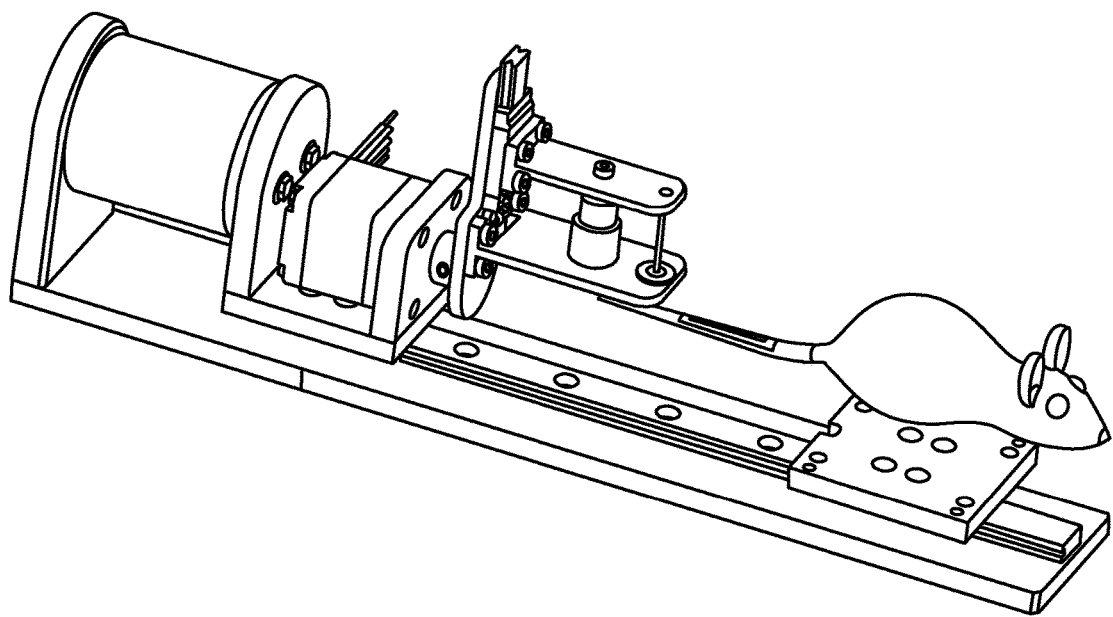
FIG. 1 depicts a first exemplary embodiment of the present disclosure.
Figure 2:
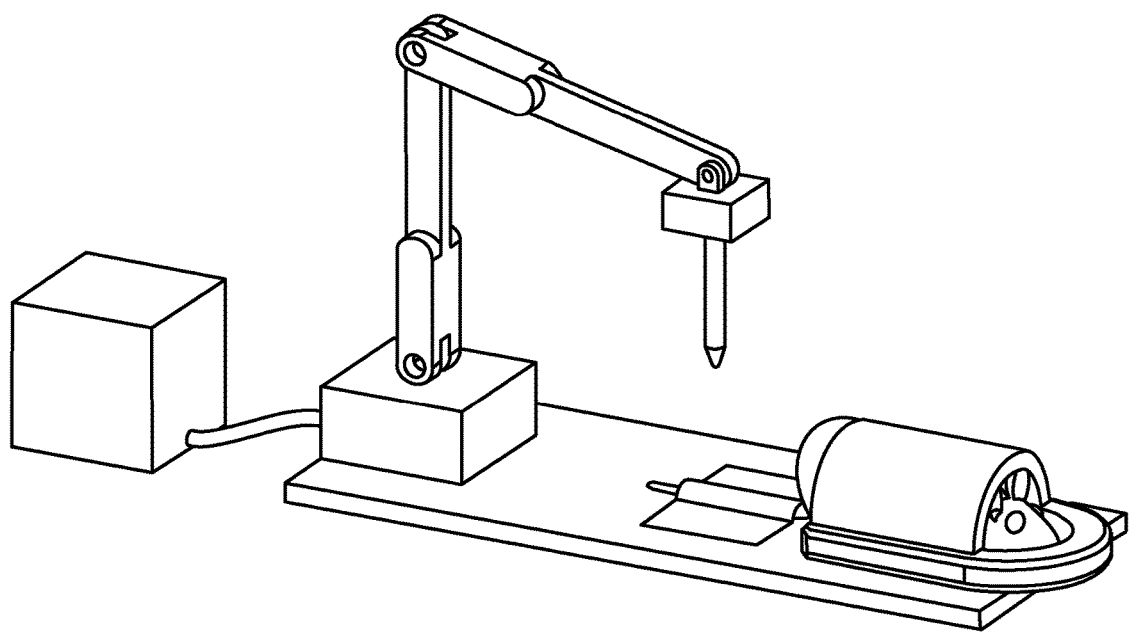
FIG. 2 depicts a second exemplary embodiment of the present disclosure.
Figure 3:
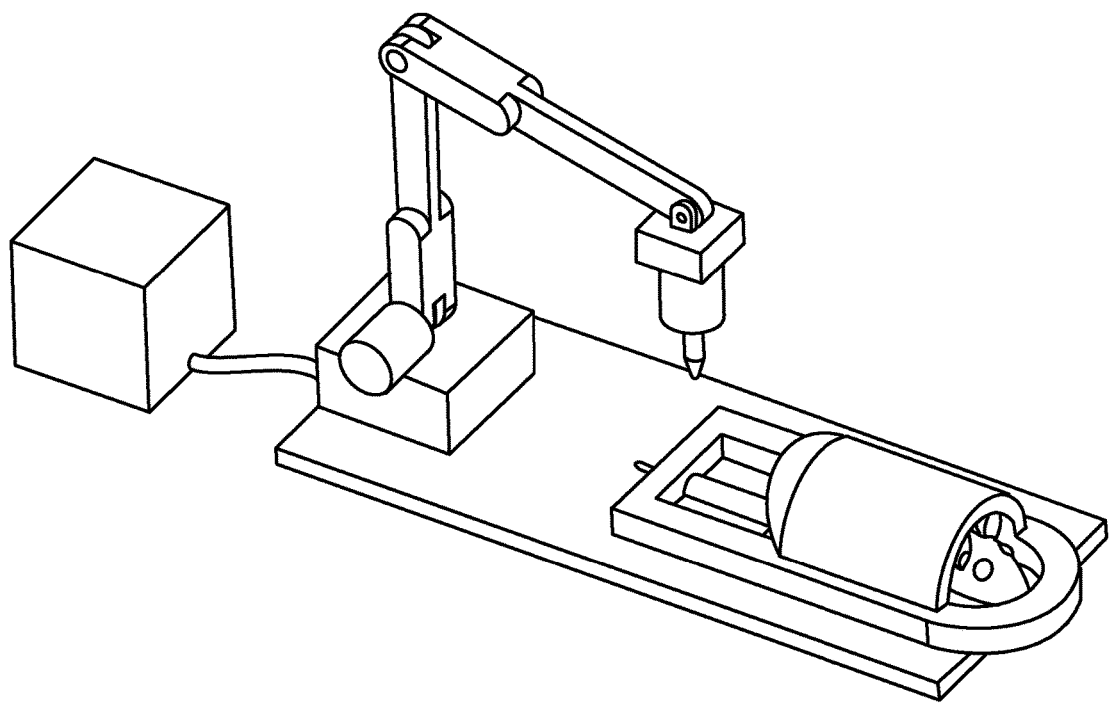
FIG. 3 depicts a third exemplary embodiment of the present disclosure.

It should be understood that the drawings are not necessarily to scale and that the disclosed embodiments are sometimes illustrated diagrammatically and in partial views. In certain instances, details which are not necessary for an understanding of the disclosed apparatus or method which render other details difficult to perceive may in some embodiments have been omitted. It should be understood, of course, that this disclosure is not limited to the particular embodiments illustrated herein.

DETAILED DESCRIPTION OF EMBODIMENTS

As used here, the following definitions and abbreviations apply.

As described herein, the term "exemplary" (or "e.g." or "by example") means a non-limiting example. The term "exemplary" is not specifically intended to indicate a preferred example.

As described herein, the term "bio-safe" means is substantially non-toxic to an animal when used in the disclosed manner. Determinants of toxicity are known in the art. Optionally, toxicity is determined with respect to one of: mortality, effect on overall health, disease state, perturbation of an animal's normal activities (upon acute and/or chronic exposure), and the like.

As described herein, the term "body part restraint" means a restraining a device which immobilizes a body part of an animal. Optionally, a body part restraint immobilizes a substrate portion of an animal. For example, a body part restraint can immobilize a substrate portion of an animal by contacting the substrate portion itself, or contacting a different portion of the animal such that the substrate portion is immobilized.

As described herein, the term "bio-permanent" means remains in or on an animal for a substantial duration of the animal's life.

As described herein, the term "n±x" means a range extending from (n−x %×n) to (n+x). Such a phrase is not intended to set forth error or precision in measurement.

As described herein, the term "skin" means the external covering or integument of an animal body. In one embodiment, it includes subdermal cartilage and/or matrix.

As described herein, the term "proximal" and "distal" refer to the direction in which the marking device marks the marking substrate (e.g. tails) of an animal. Specifically, the term "proximal" refers to the direction towards the animal's body and the term "distal" refers to the direction towards the animal's extremity.

As described herein, the term "tip length deviation" refers to length uniformity of a group of co-planar needle tips, in which "tip length deviation" is the maximum distance between the common plane and any out-of-plane needle tip(s).

As described herein, the term "tip concentration deviation" refers to the X-Y positioning uniformity of a compact group of needle tips, in which "tip concentration deviation" is the maximum distance between the geometric center of the grouped needle tips and the X-Y reference feature of the needle cartridge (e.g. the center axis of the locating cylinder).

When describing the media transfer assembly of the marking system, the term "lower" refers to a position relatively closer to the marking substrate, and the term "upper" refers to a relatively further away from the marking substrate.

The present disclosure generally provides a marking system that is configured to mark an animal with one or more features. For example, the mark may in some embodiments be durable, easily applied, relatively non-invasive, may in some embodiments have a safety profile, low level of cross-read (e.g. less interference produced by other animals in proximity to each other), and may in some embodiments be read with a high level of accuracy (e.g. greater than about 80% or greater than about 90% or greater than about 95% accuracy).

Figure 4:
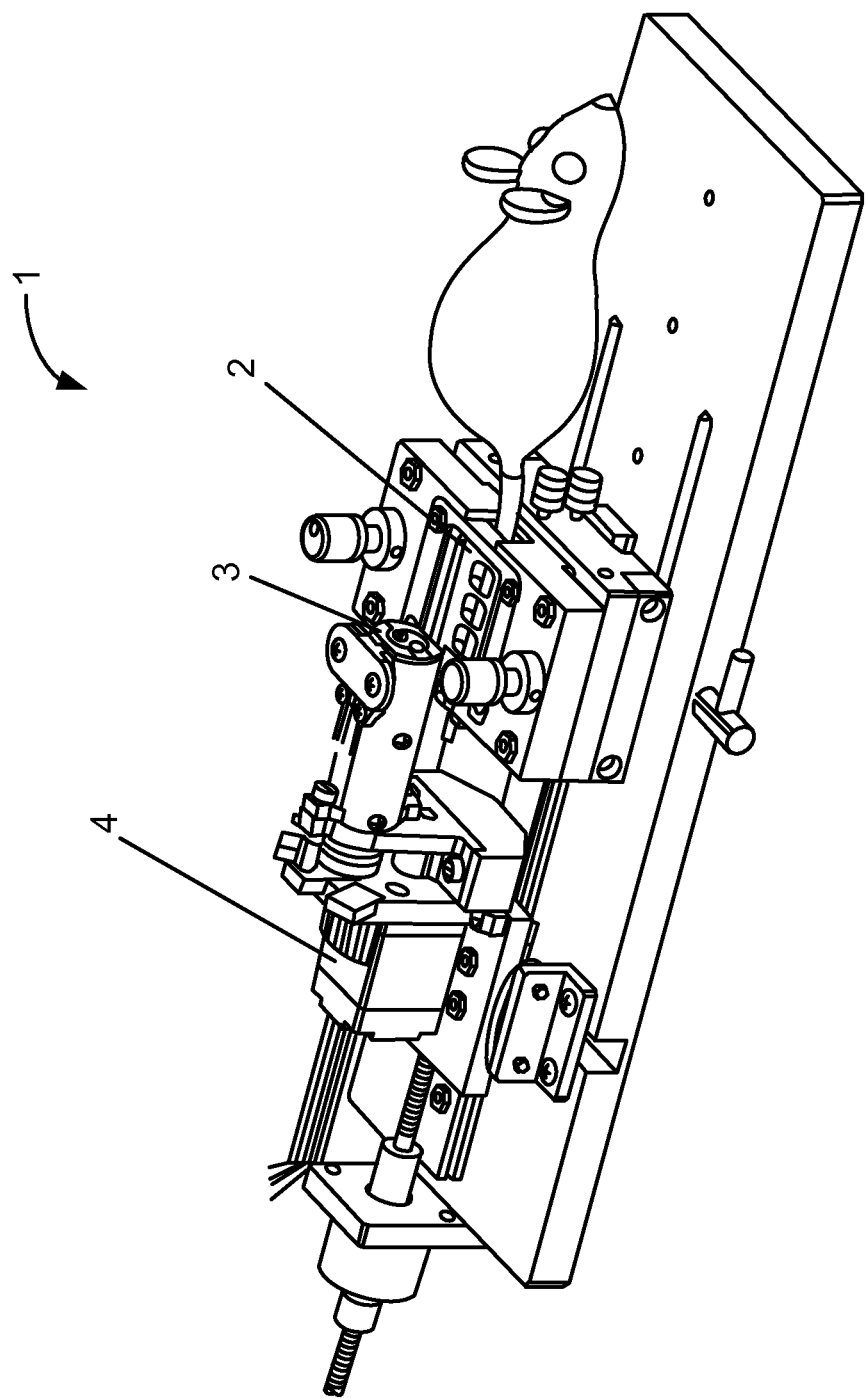
FIG. 4 depicts a fourth exemplary embodiment of the present disclosure.

In a general embodiment illustrated in FIG. 4, the marking system 1 according to the present disclosure includes a restraining device 2, a marking device 3, and a controller 4. In operation, the restraining device 2 immobilizes a marking substrate of an animal body part, while the controller 4 operates the marking device 3 to make a readable mark on the marking substrate, such as by depositing a pigment under the skin of the marking substrate, as described in greater detail below.

Restraining Device

The restraining device, useful according to the present disclosure, is any device that can restrain the body part of an animal to be marked. For example, in one embodiment the restraining device has a first part useful for restraining the main body of the animal, and a second part useful for restraining and presenting the body part to be marked to the marking device. Useful restraining devices include those that do not kill, harm, or cause undue duress or stress to the animal. Further useful features of the restraining device include said device's ability to compensate for variations in taper, girth, and/or other abnormalities of the tail.

In one embodiment, the marking system comprises one restraining device having a spring-loaded tapered v-groove to support the underside of the tail during marking and that is used to compensate for differences in size of the substrate body part while still enabling the marking system to maintain the target pigment depth of the marking.

In one embodiment, the marking system comprises a plurality of restraining devices each having a spring-loaded tapered v-groove of varying size to support the underside of the tail during marking and that are used to compensate for the range of differences in size of the substrate body part while still enabling the marking system to maintain the target pigment depth of the marking.

In one embodiment, the restraining device is comprised of a one-piece spring-loaded plate having a tapered v-groove supporting the substrate body part.

Optionally, the one-piece spring-loaded tapered v-groove plate is additionally enclosed within a protective compliant boot.

In one embodiment, the restraining device is comprised of a modulated spring-loaded plate that includes multiple independently articulating self-aligning spring-loaded tapered v-groove sections the combination of which comprise the tapered v-groove plate supporting the substrate body part.

Optionally, the multiple spring-loaded tapered v-groove sections are additionally enclosed within a protective compliant boot.

Figure 8:
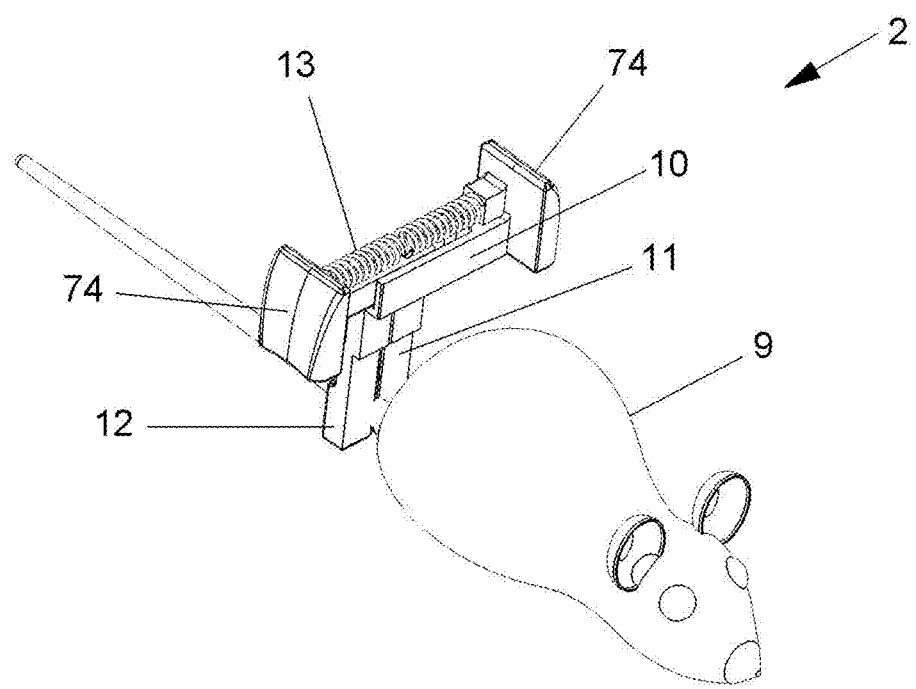
FIG. 8 depicts an exemplary restraining device according to the present disclosure.

Turning now to non-limiting examples of the restraining device 2, and with particular reference to FIG. 8, which illustrates a restraining device 2 that utilizes a body part cleat 10 that may in some embodiments provide rapid and secure immobilization of an animal or body part thereof. The body part (e.g. tail) cleat 10 includes opposing members 11 and 12. The body part cleat 10 further includes a biasing member 13, such as a spring, that biases the opposing members 11, 12 against each other, thereby restraining the body part (e.g. tail) from longitudinal or Y axis movement, when the body part is inserted and secured between the opposing members 11, 12. As illustrated, the body part cleat 10 in one embodiment is positioned proximal to the trunk of a mouse.

As illustrated in FIG. 8, the body part cleat 10 may in some embodiments include finger tabs 74 such that the user loads and releases the body part with a single hand and in a single motion. Although the body part cleat 10 is depicted has having opposing members 11, 12 which slide about each other (a sliding cleat), the body part cleat can alternatively be provided in other configurations (e.g. as described herein).

Figure 9:
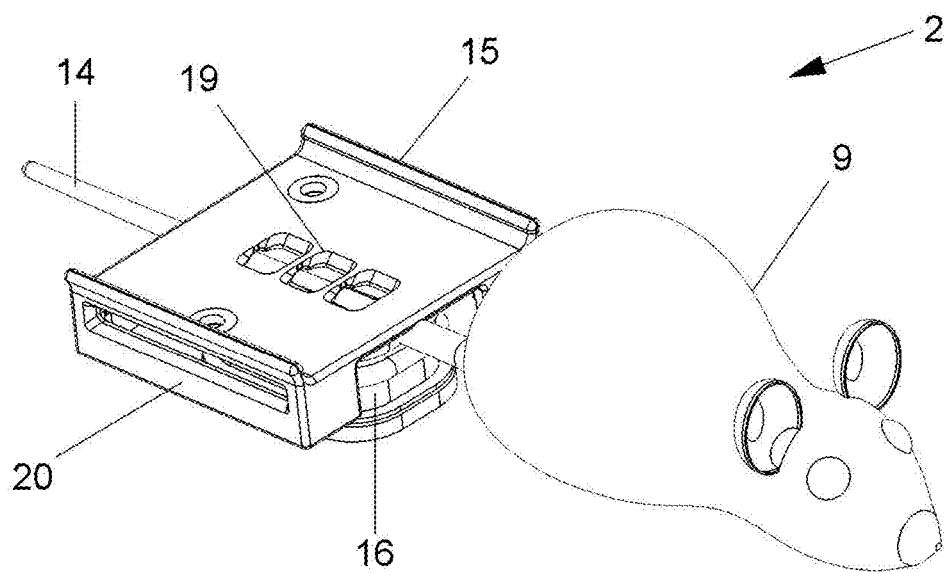
FIG. 9 depicts an exemplary body part plate assembly according to the present disclosure.
Figure 10:
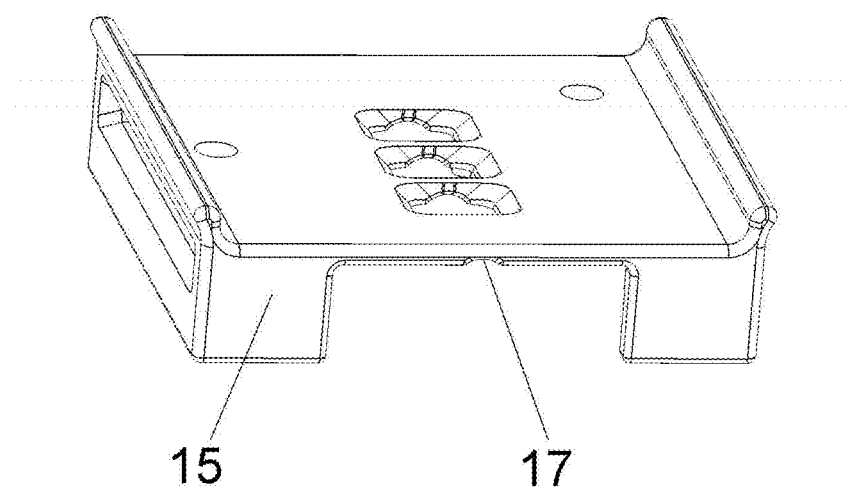
FIG. 10 depicts an exemplary body part plate according to the present disclosure.
Figure 11:
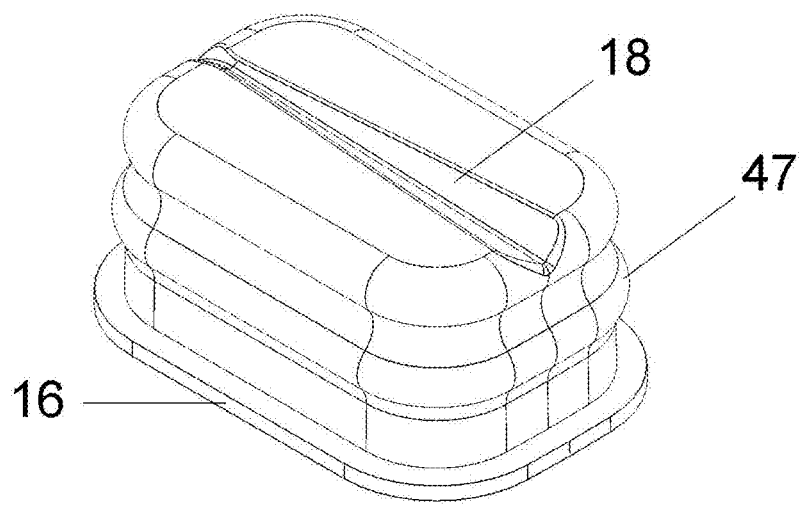
FIG. 11 depicts an exemplary protective compliant boot according to the present disclosure.

Referring now to FIGS. 9-11, the restraining device 2 may in some embodiments include a body part plate assembly 20 that may in some embodiments provide rapid and secure immobilization of an animal or body part thereof. As illustrated, the plate assembly 20 includes a top plate 15 and an adjustable (e.g. spring-loaded) bottom plate assembly 16, which cooperate with each other to precisely orient the top surface of the marking substrate (e.g. tail or other body part) relative to the marking device 3. For example, the top surface of the marking substrate may be secured between the top plate 15 and the adjustable bottom plate assembly 16 in a horizontal position (or at a desired angle or along a desired axis or other orientation).

In a refinement, the top plate 15 may also be adjustable. For example, adjustment of the final angle or orientation of the top surface of the marking substrate may in some embodiments be achieved by adjusting the angle of top plate 15.

Figure 24:
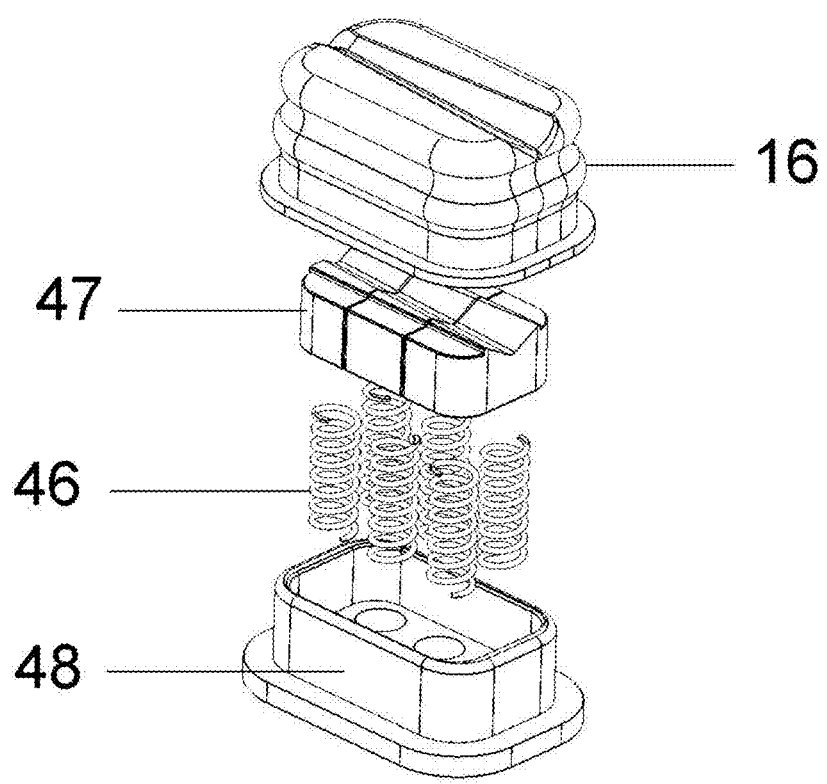
FIG. 24 depicts an exploded view of an exemplary spring loaded tail plate according to the present disclosure.
Figure 33:
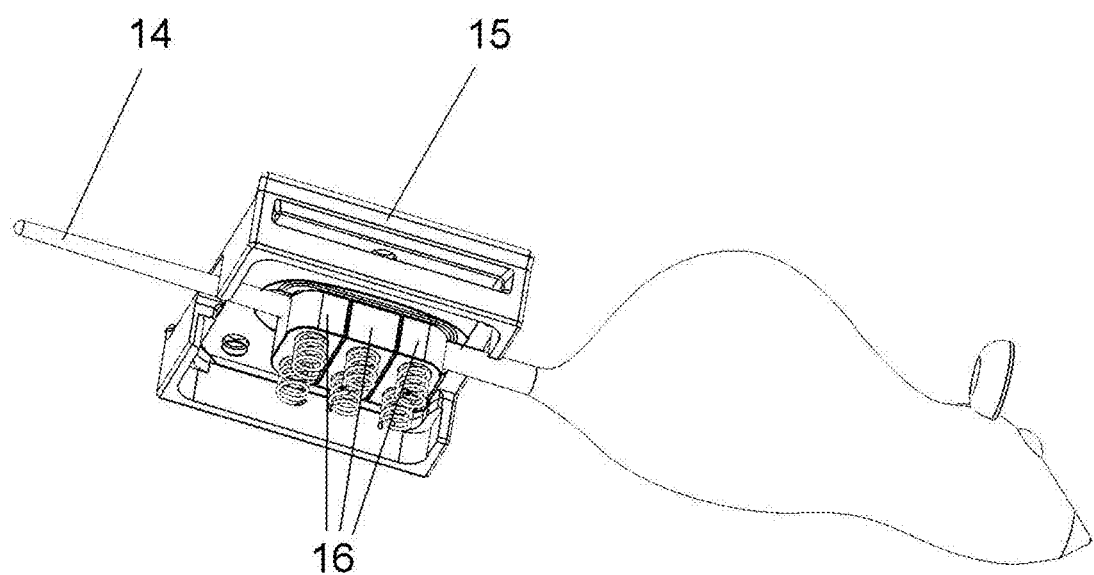
FIG. 33 depicts an exemplary body part plate assembly according to the present disclosure.

Turning now to the exploded view of FIG. 24, the adjustable bottom plate assembly 16 includes a bottom plate 47 and biasing means 46, such as springs or other conformative biasing means or other elastic-biasing means, for example, to press the bottom plate 47 (with marking substrate supported therein) against the top plate 15, as depicted in FIG. 9 and FIG. 33. When using conformative biasing means such as springs 46 (e.g. under all four corners of plate 47), the spring loaded bottom plate 47 conforms to the angle of the bottom surface of the marking substrate as it opposes the top plate 15, as depicted in FIG. 33. As depicted in FIG. 24, the adjustable bottom plate assembly 16 in some embodiments optionally includes a mount 48 for support and/or include a boot 49 (e.g. made of rubber or other non-rigid material) to translate the motion of the bottom plate 47 without exposing the underlying mechanism (e.g. the bottom plate 47 and the biasing means 46) to dirt and debris, allowing easier cleaning and reducing contamination.

Turning now to FIGS. 10-11, the top plate 15 may include operation window(s) 19 to allow the operator and/or the marking device 3 to access the marking substrate or other restrained body part while holding its position. As illustrate in FIG. 11, in the case of a conical (or other tapered) marking substrate such as a tail, the spring loaded bottom plate 47 can be provided with a tapering v-groove 18, e.g., at an angle of 90 degrees or greater, to center various cone diameters. In a further embodiment illustrated in FIG. 10, the top plate may also include a radial groove 17 large enough to accommodate the largest conical body part that will be restrained. It is contemplated that these opposing features (v-groove 18 of spring-loaded tail plate 16 and radial groove 17 of top plate 15) may cooperatively center the marking substrate along the longitudinal axis of the v-groove 18 and radial groove 17 while secure the marking substrate evenly between the top plate 15 and bottom plate 47. In one embodiment, marks made on a marking substrate restrained by such a body part plate assembly 20 have improved precision, for example, because the plate assembly 20 restrains the substrate portion of the body part such as tail 14 from movement along the X, Z, and/or R axes.

Figure 45:
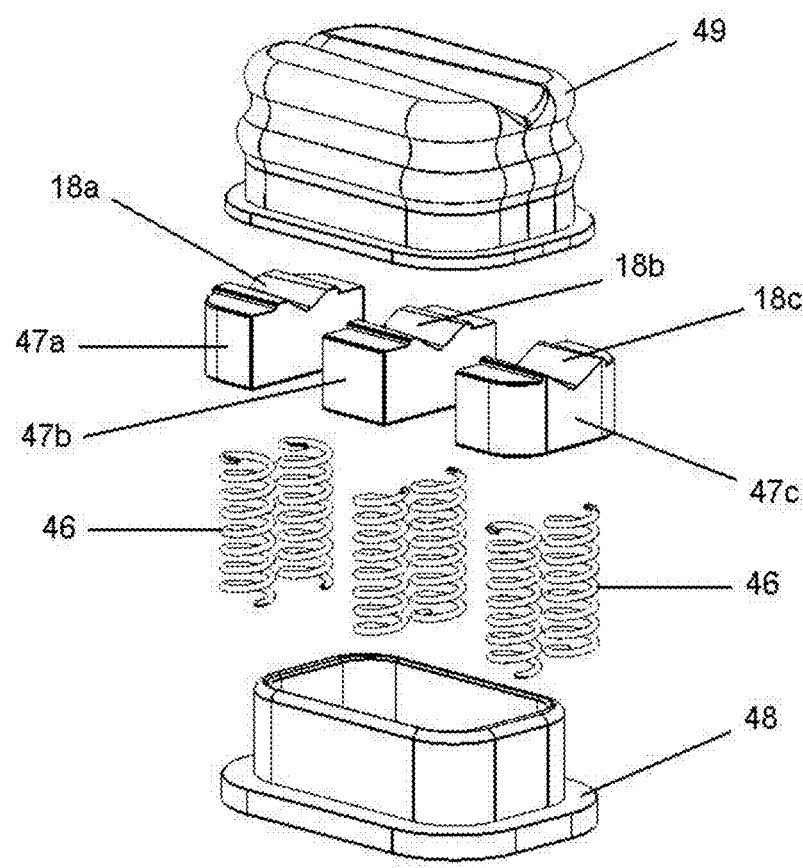
FIG. 45 depicts an exploded view of an exemplary spring-loaded tail bed particular to the restraining device comprising modulated tail plate to accommodating the size of the marking substrate according to the present disclosure.

In another embodiment, the bottom plate 47 and the tapered v-groove 18 formed thereon may be modulated to further enhance the security and precision provided by the body part plate assembly 20. Referring now to FIGS. 45-48, the modulated bottom plate 47 includes a plurality of bottom plate sections each including a section of the tapering v-groove 18. As illustrated in FIG. 45, the modulated bottom plate 47 includes three bottom plate sections (47a, 47b, 47c). Each of those sections includes a section of the tapering v-groove 18 (18a, 18b, 18c, respectively). It is to be understood that the number of bottom plate sections may be dependent on the nature of the marking substrate, the dimension of the of the body part plate assembly 20, and should not be limited to the non-limiting examples illustrated in FIGS. 45-48. For example, the bottom plate 47 may include two or more than three bottom plate sections in other embodiments of the present disclosure.

Figure 46:
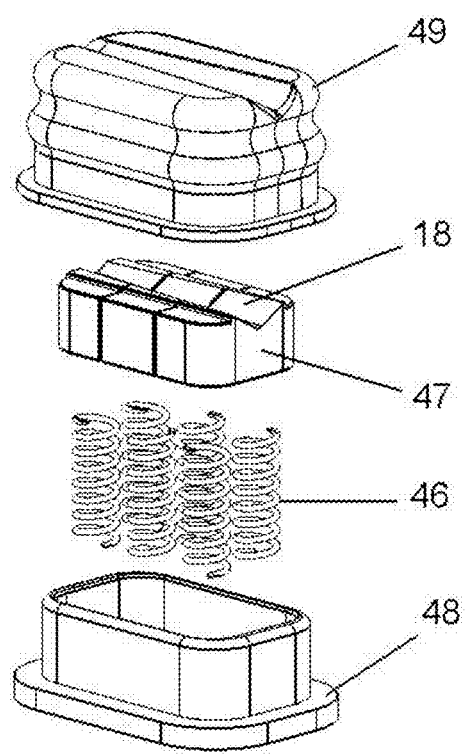
FIG. 46 depicts an exploded view of an exemplary spring-loaded tail bed particular to the restraining device comprising modulated tail plate to accommodating the size of the marking substrate according to the present disclosure, particularly illustrating the modulated tail plate assembled together.
Figure 47:
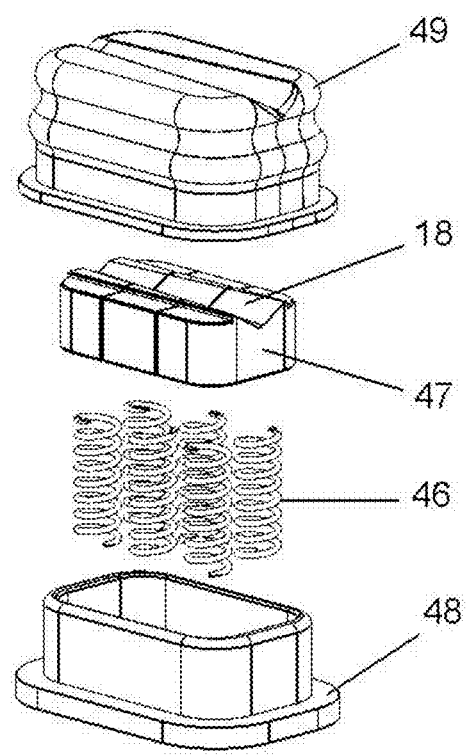
FIG. 47 depicts an exploded view of an exemplary spring-loaded tail bed particular to the restraining device comprising modulated tail plate to accommodating the size of the marking substrate according to the present disclosure, particularly illustrating the modulated tail plate assembled together with springs.
Figure 48:
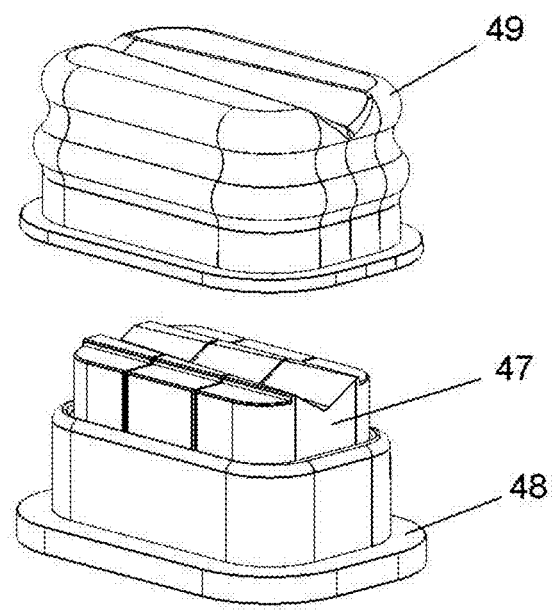
FIG. 48 depicts a perspective view of an exemplary spring-loaded tail bed particular to the restraining device comprising modulated tail plate to accommodating the size of the marking substrate according to the present disclosure, particularly illustrating the modulated tail plate assembled in the tail plate base.

Still referring to FIG. 45, each of the bottom plate sections (47a, 47b, 47c) may be provided with biasing means (46a, 46b, 46c), such as springs or other conformative biasing means or other elastic-biasing means. Such a modulated configuration allows each of the tapering v-groove sections (18a, 18b, 18c) to be independently articulating and self-aligning, thereby further enhancing the security and precision provided by the body part plate assembly 20. As illustrated in FIGS. 46-48, the modulated bottom plate 47 in some embodiments may be assembled in a mount 48 for support. Moreover, the modulated bottom plate 47 in some embodiments may include a boot 49 (e.g. made of rubber or other non-rigid material) to translate the motion of the bottom plate sections (47a, 47b, 47c) without exposing the underlying mechanism (e.g. the modulated bottom plate 47 and the biasing means 46) to dirt and debris, allowing easier cleaning and reducing contamination.

Figure 21:
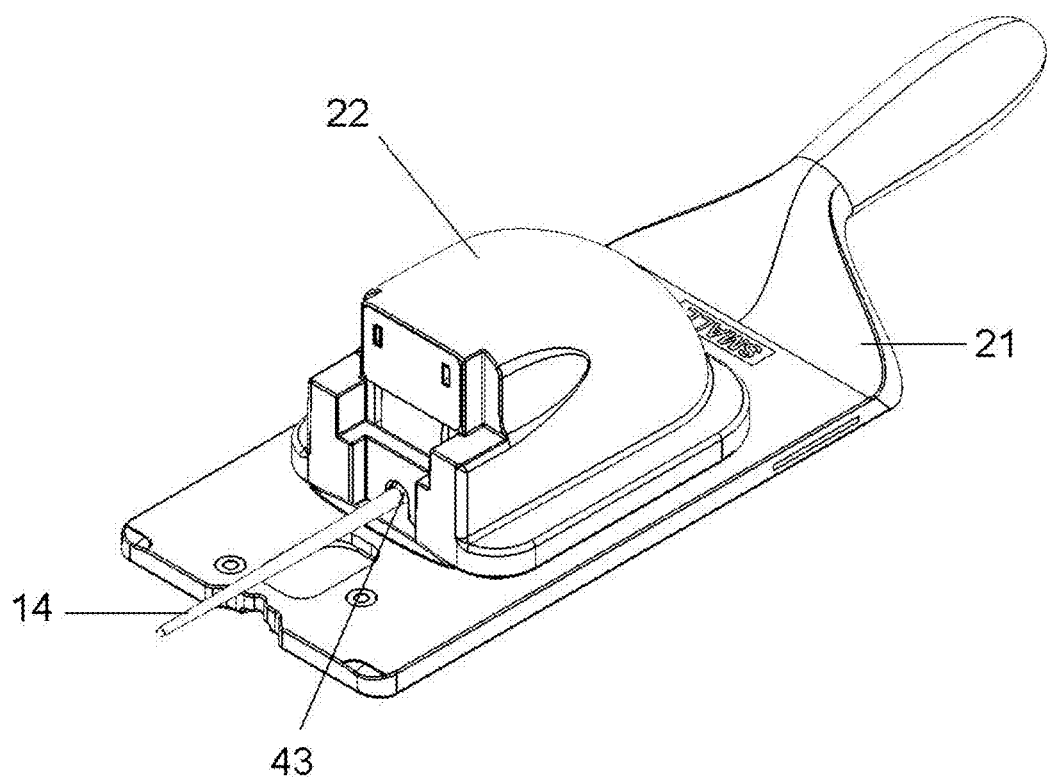
FIG. 21 depicts an exemplary restraining device according to the present disclosure.
Figure 22:
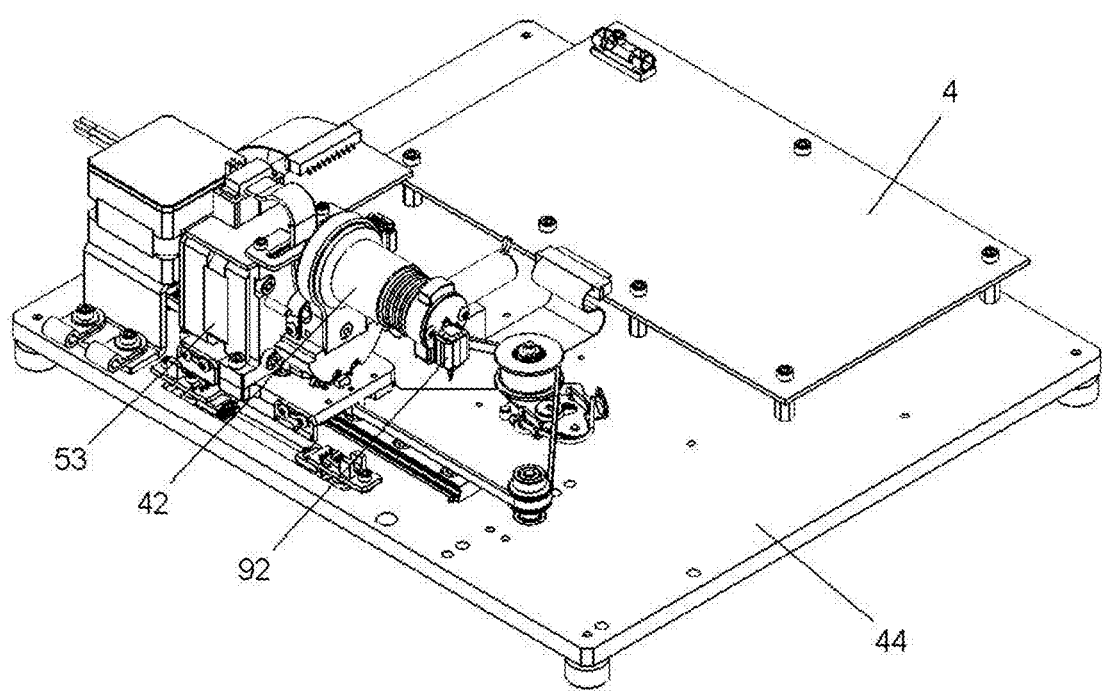
FIG. 22 depicts an exemplary robot assembly and controller according to the present disclosure.
Figure 23:
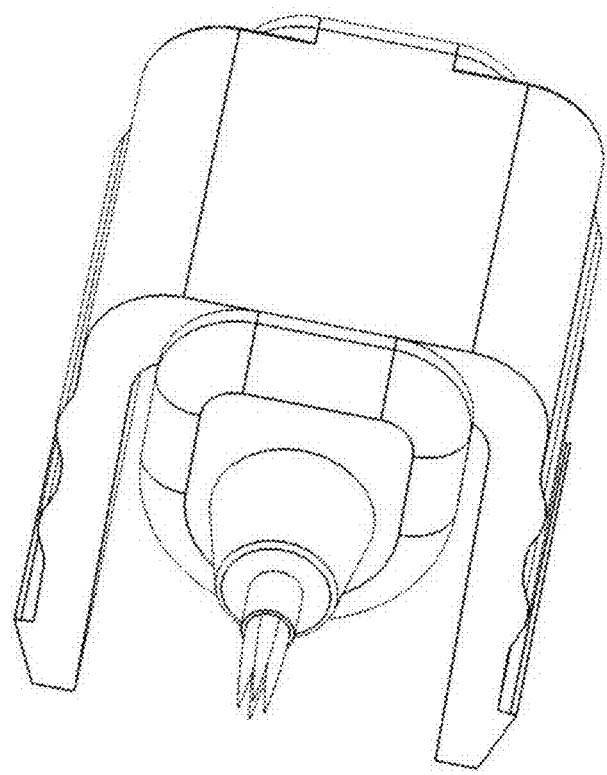
FIG. 23 depicts an exemplary marking needle and needle cartridge assembly according to the present disclosure.

Referring now to FIG. 21 the restraining device may in some embodiments also utilize a body restraint 22 to further secure the animal. The body restraint 22 may in some embodiments be provided on a support, such as a baseplate 21. The body restraint 22 is sized to house an animal (or abdominal portion thereof) and comprises a body part port 43 sized to allow a body part comprising the substrate (e.g. tail) to be withdrawn from the body restraint 22 while the trunk of the animal remains in the body restraint 22.

The body restraint 22 in some embodiments is configured in any shape or size that restrains the trunk of the animal, prevents the animal from swiveling its head to harm (e.g. bite) itself, and/or prevents the animal from contorting or pivoting about its body part (e.g. tail). The restraint in some embodiments further comprise reversible fixing means such as magnets for securing the restraint to a baseplate or other surface such as a lab bench (e.g. stainless steel table top).

Figure 34:
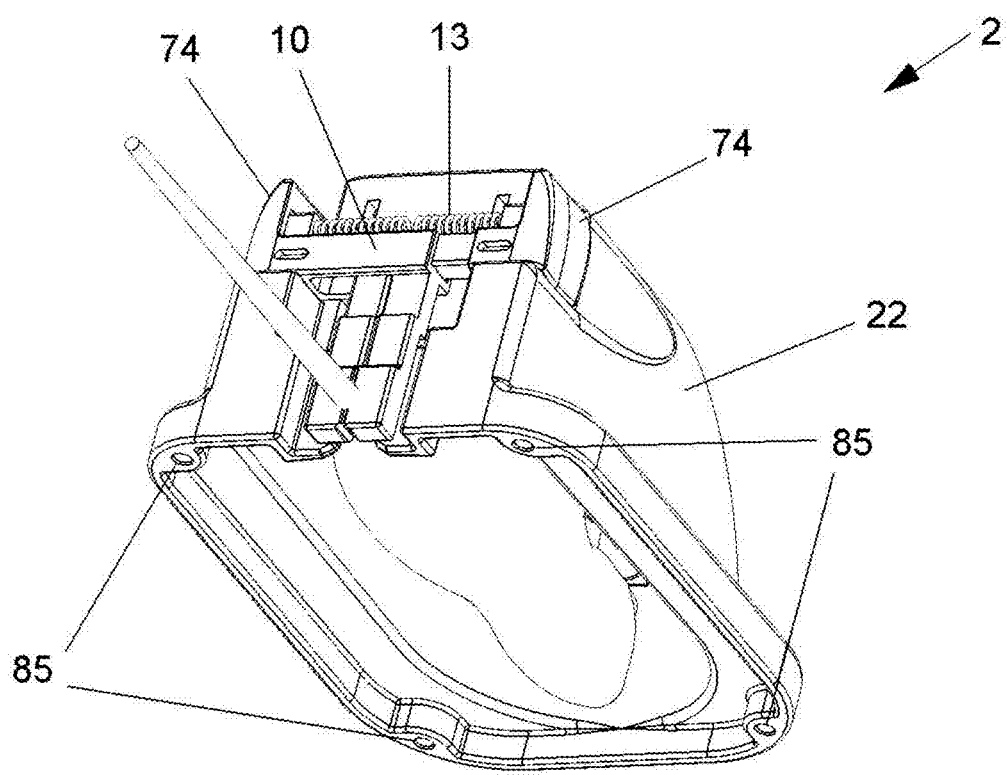
FIG. 34 depicts an exemplary restraining device comprising a body restraint and a body part restraint according to the present disclosure.
Figure 35:
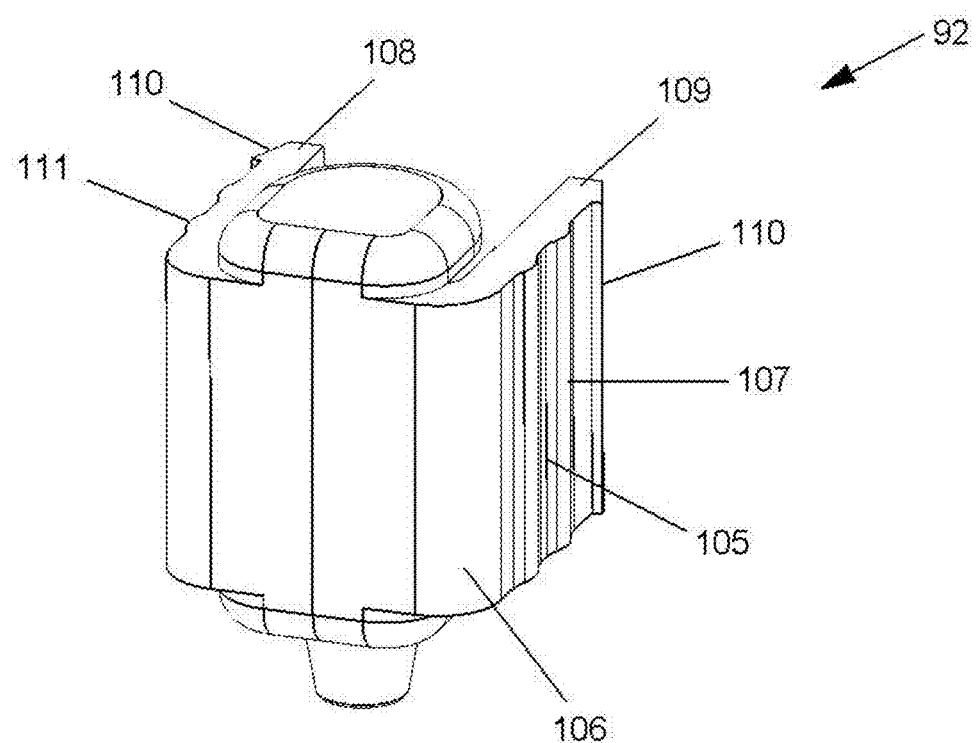
FIG. 35 depicts an exemplary needle cartridge in front perspective view according to the present disclosure.
Figure 36:
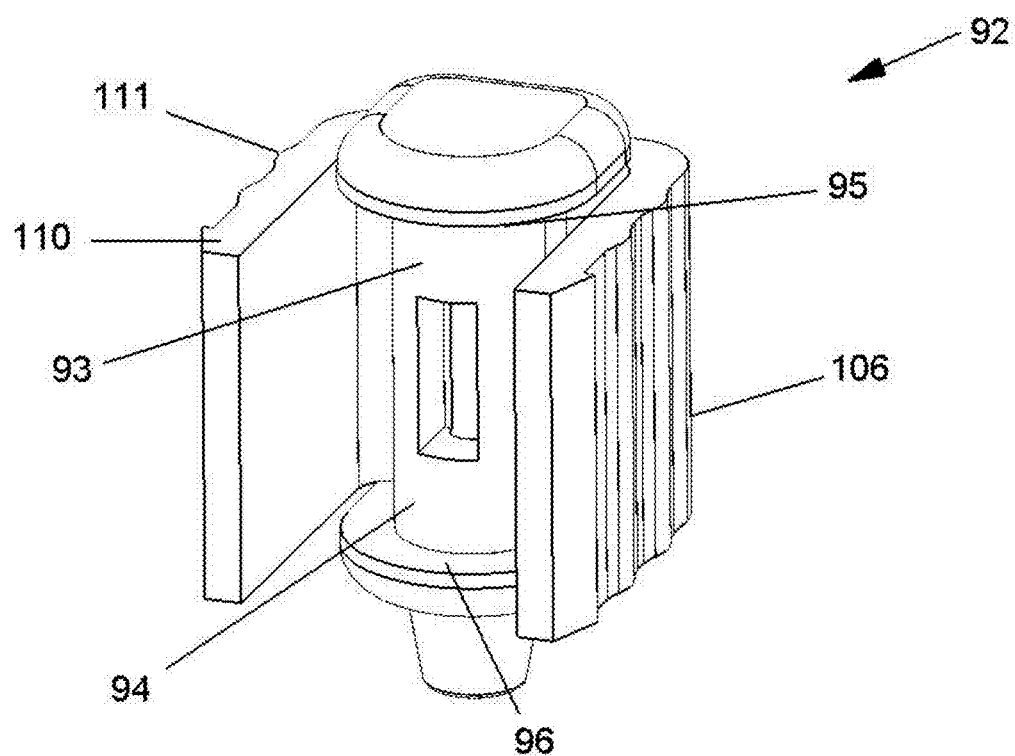
FIG. 36 depicts an exemplary needle cartridge in back perspective view according to the present disclosure.
Figure 37:
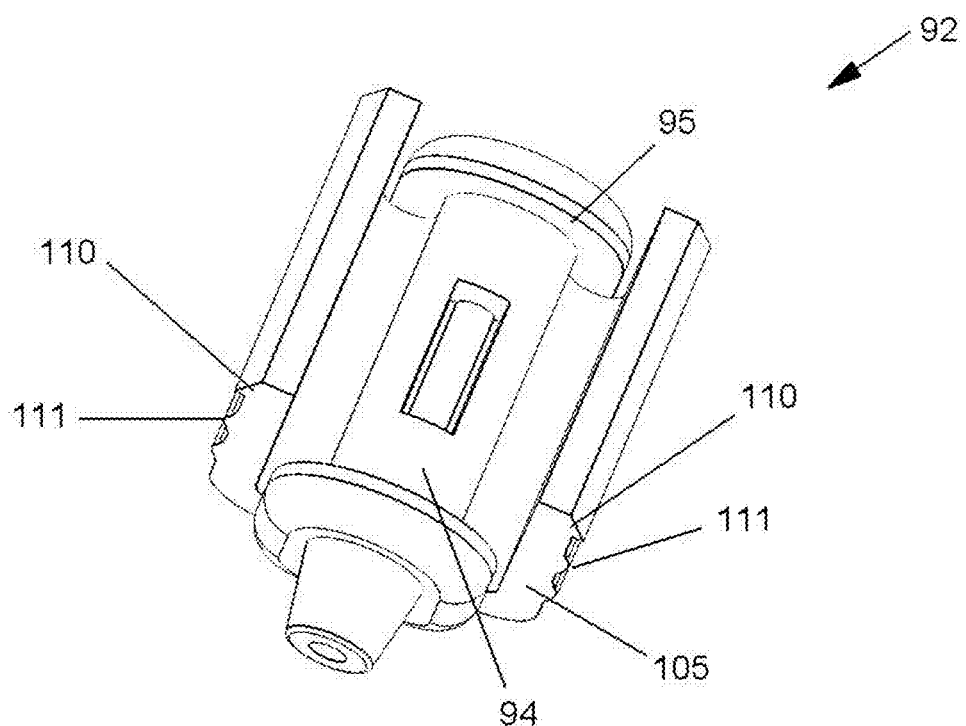
FIG. 37 depicts an exemplary needle cartridge in rear perspective according to the present disclosure, particularly illustrating the upper reference feature.
Figure 38:
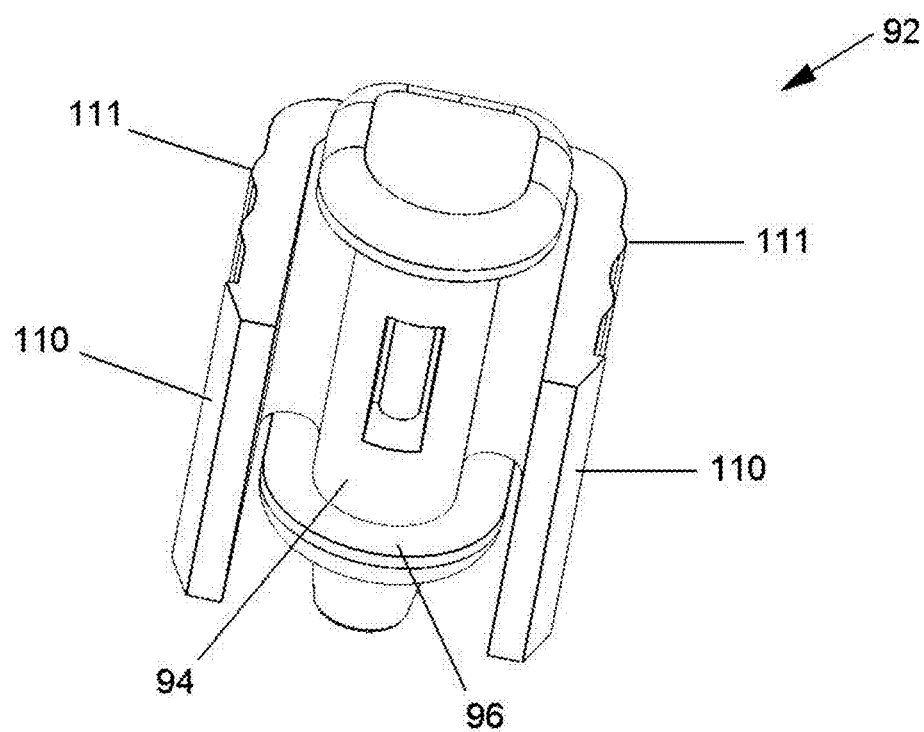
FIG. 38 depicts an exemplary needle cartridge in rear perspective according to the present disclosure, particularly illustrating the lower reference feature.

Turning now to FIG. 34, the restraining device 2 may in some embodiments include a body restraint 22 and a body part cleat 10.

Figure 32:
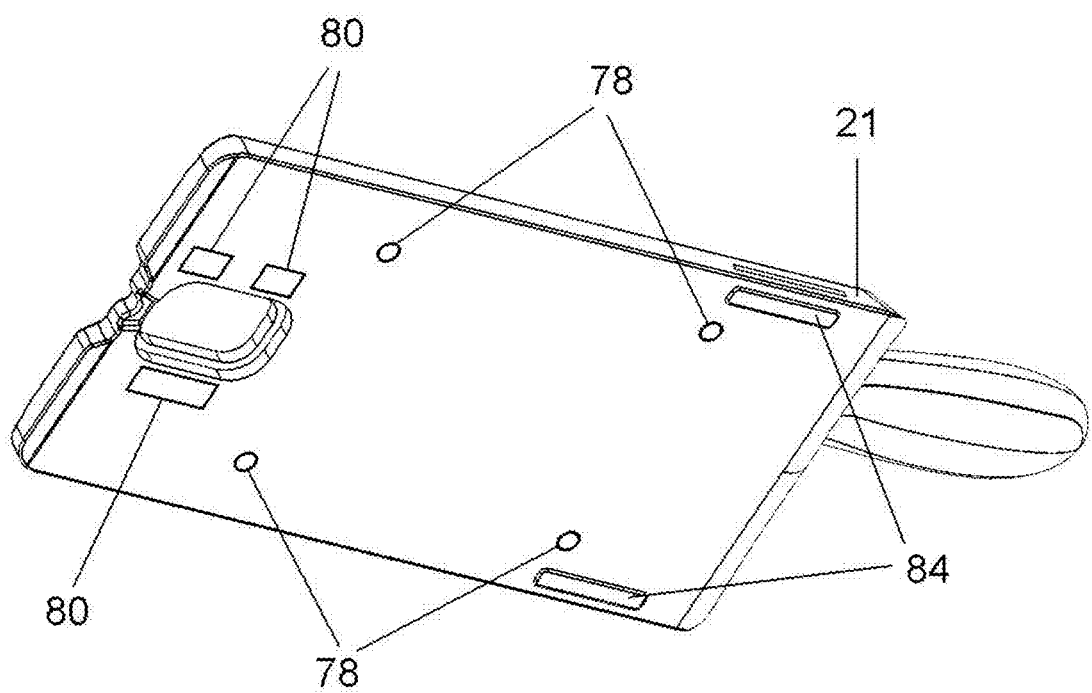
FIG. 32 depicts an exemplary baseplate according to the present disclosure.

FIG. 34 depicts a useful restraining device 2 of the present invention. In one embodiment, the body restraint 22 comprises reversible fixing means such as magnets 85. For example, magnets 85 can be secured to a metal table top, or can be specifically patterned to correspond to a pattern of magnets 78 on a baseplate 21, as depicted in FIG. 32.

The body part cleat 10 may in some embodiments be fixed to the body restraint 22 such that the user can hold the entire restraining device in one hand with fingers (e.g. a thumb and an index finger) depressing tabs 74 of the body part cleat 10 to separate opposing members 11, 12 from each other. The user can then simultaneously restrain both trunk and the body part (e.g. tail) of the animal (e.g. mouse) simply by placing the restraining device over the animal such that the body part is positioned between opposing members 11, 12, and then releasing his fingers from tabs 74.

In one embodiment, such a restraining device 2 optionally provides rapid but secure immobilization of an animal. In one embodiment, such a configuration allows a user to operate a second restraining device with a second hand, to simultaneously restrain two animals.

Figure 12:
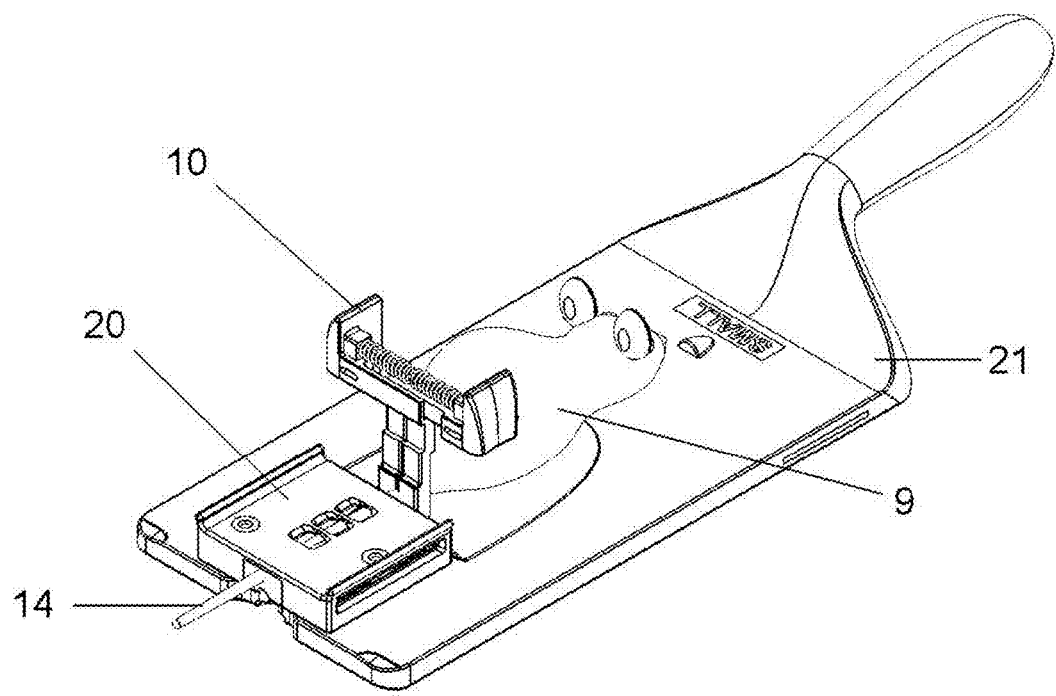
FIG. 12 depicts an exemplary restraining device according to the present disclosure.
Figure 13:
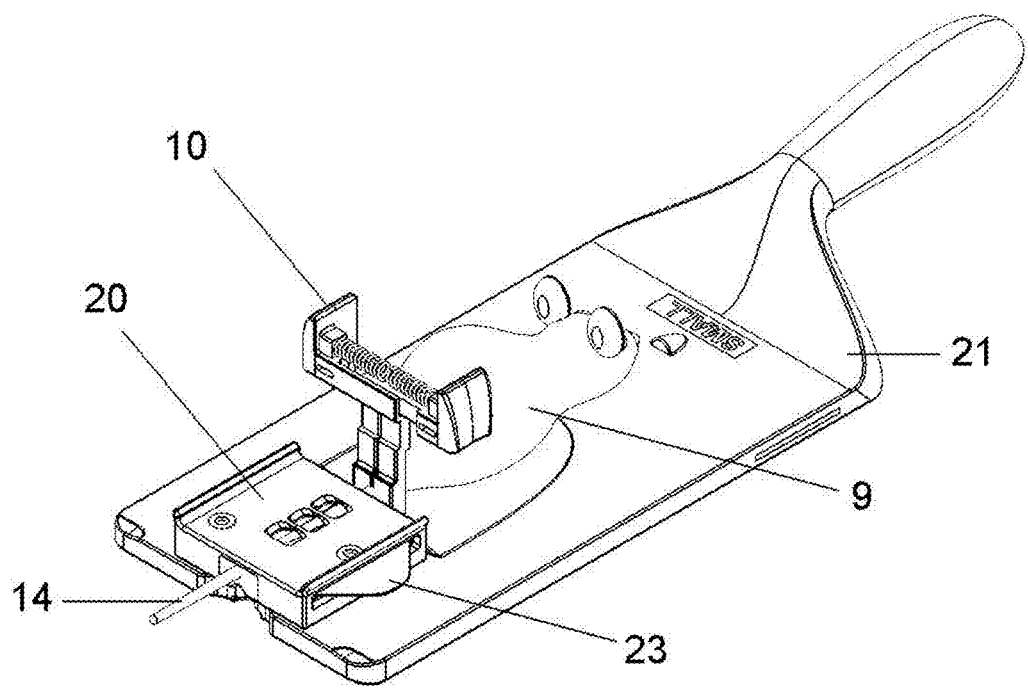
FIG. 13 depicts an exemplary restraining device and an exemplary media transfer assembly according to the present disclosure.
Figure 14:
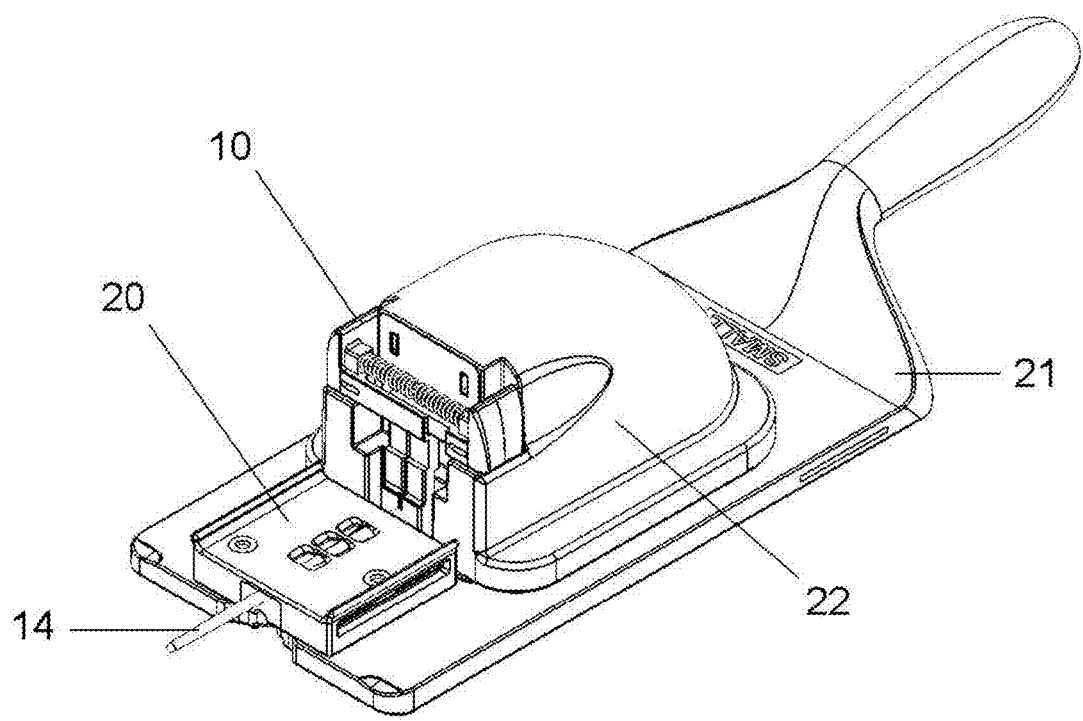
FIG. 14 depicts an exemplary restraining device with domed animal enclosure according to the present disclosure.
Figure 15:
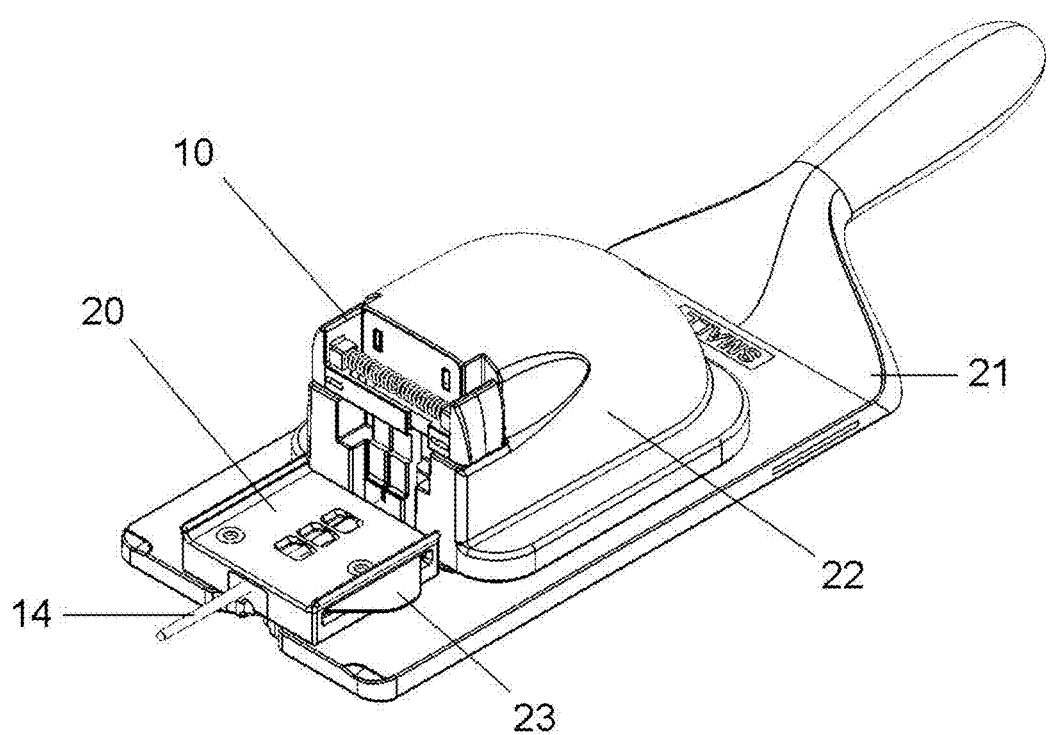
FIG. 15 depicts an exemplary restraining device and an exemplary media transfer assembly according to the present disclosure.
Figure 16:
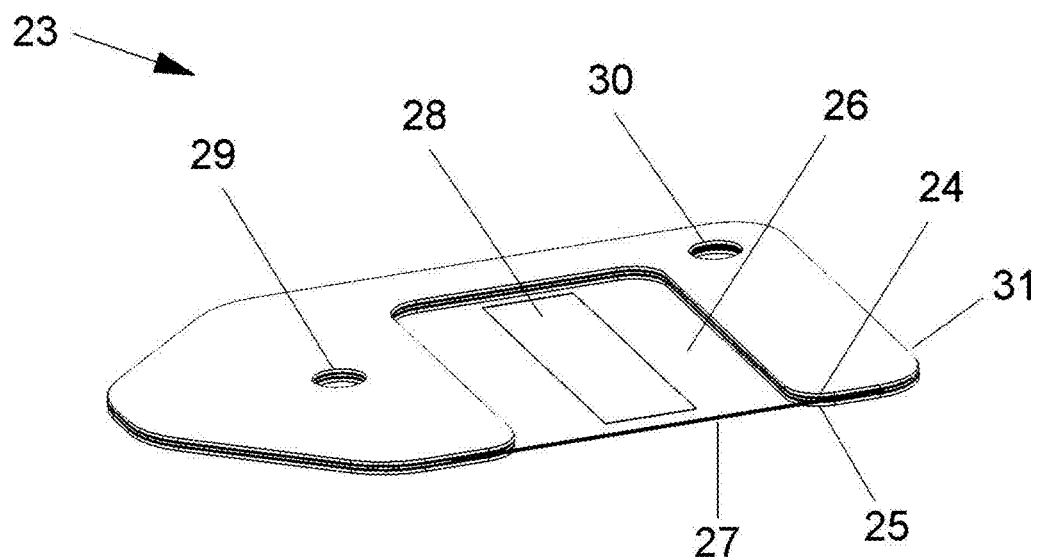
FIG. 16 depicts an exemplary media transfer assembly according to the present disclosure.
Figure 17:
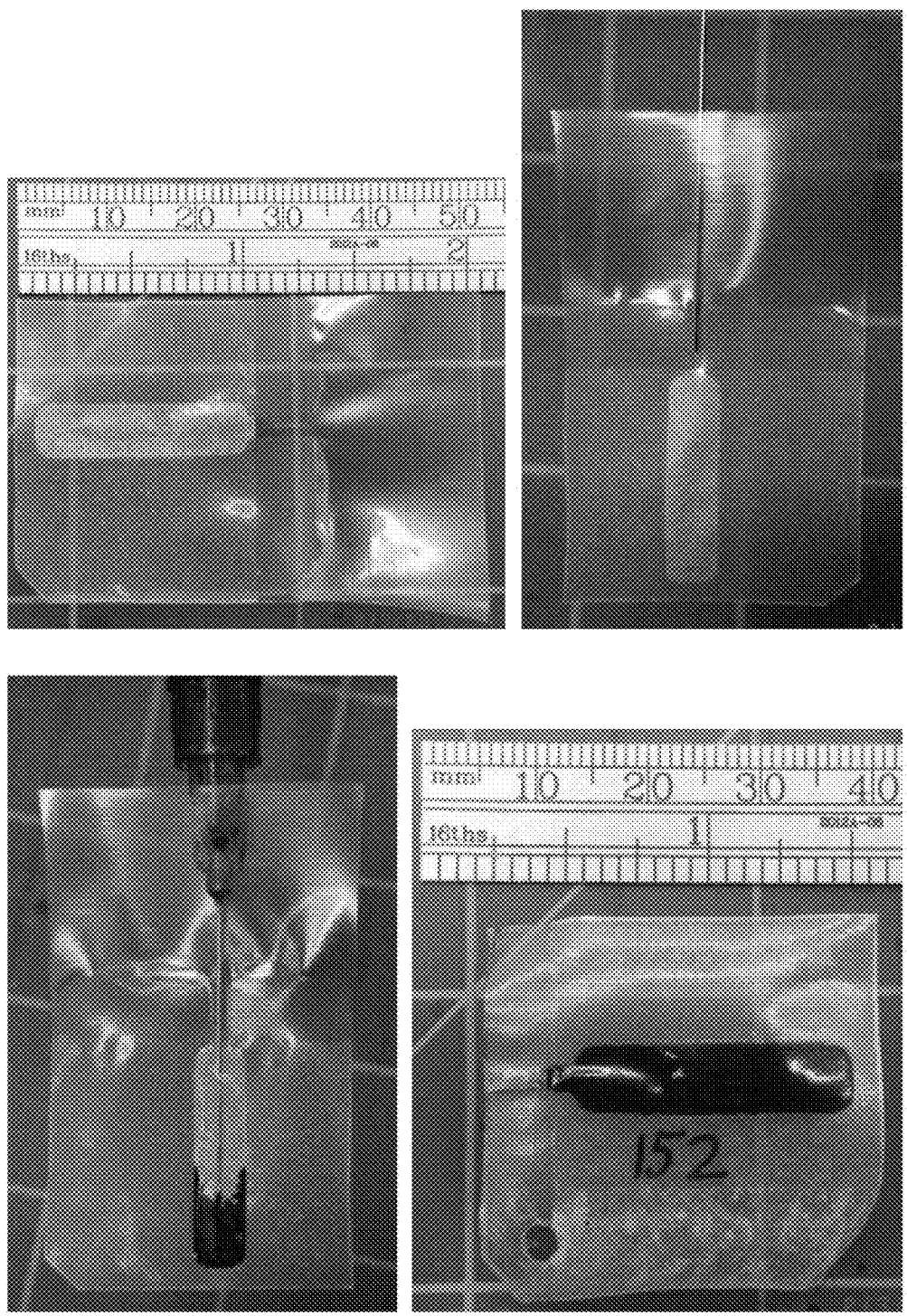
FIG. 17 depicts filling of a pigment compartment in an exemplary media transfer assembly according to the present disclosure.
Figure 18:
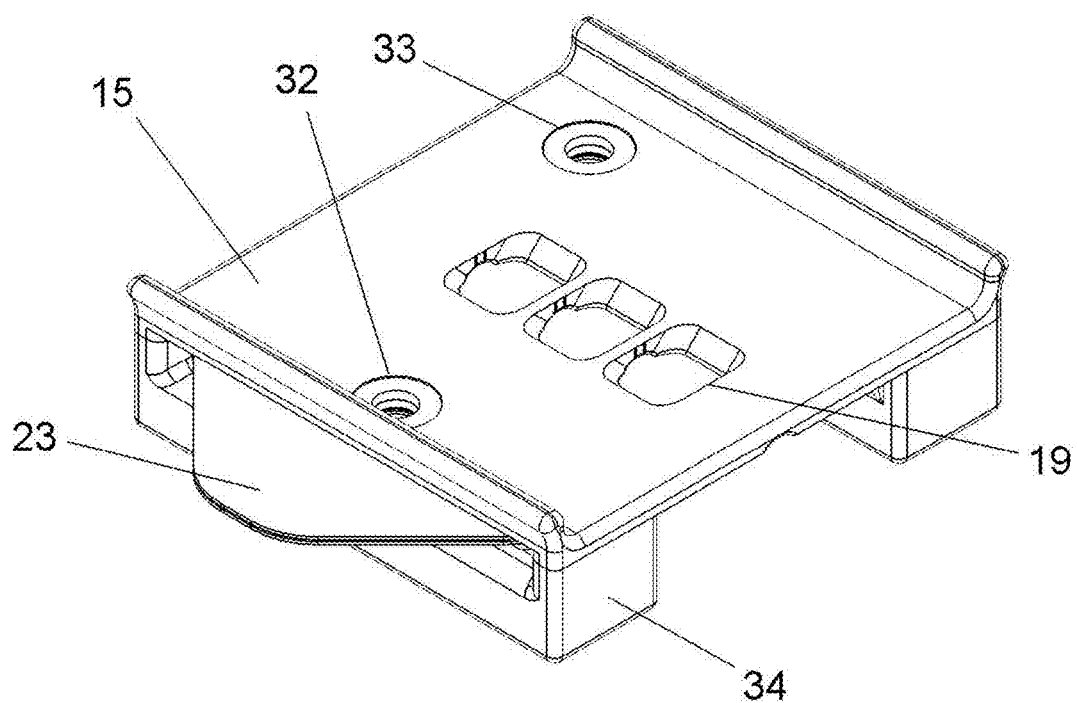
FIG. 18 depicts an exemplary media transfer assembly inserted into an exemplary body part restraint according to the present disclosure.

Referring now to FIG. 12, the restraining device 2 may in some embodiments include a body part plate assembly 20 and a body part cleat 10. In particular, the restraining device 2 may in some embodiments include a tail cleat 10, as illustrate in FIG. 8, and further comprises a tail plate assembly 20, as illustrated in FIGS. 9-11. The tail cleat 10 restrains the tail (or substrate portion thereof) from moving longitudinally (e.g. along the Y axis) while the tail plate assembly 20 restrains the tail (or substrate portion thereof) from moving laterally and/or vertically (e.g. from movement along the X, Z, and/or R axes). In one embodiment, marks made on a substrate restrained by such a restraining device 2 are characterized with enhanced precision.

Figure 19:
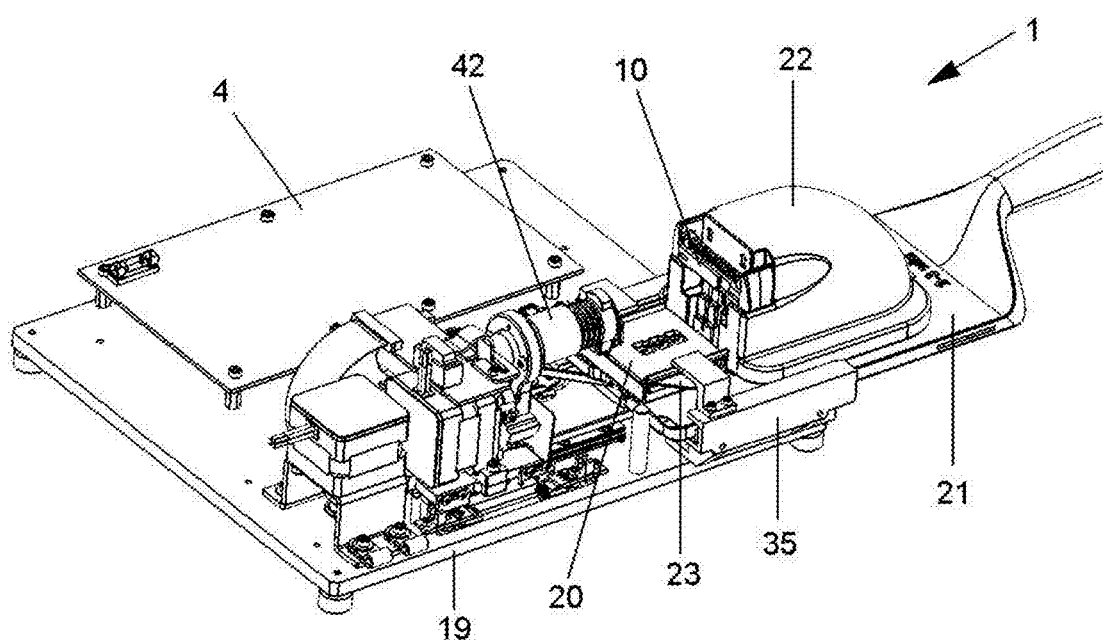
FIG. 19 depicts an exemplary marking system according to the present disclosure.
Figure 20:
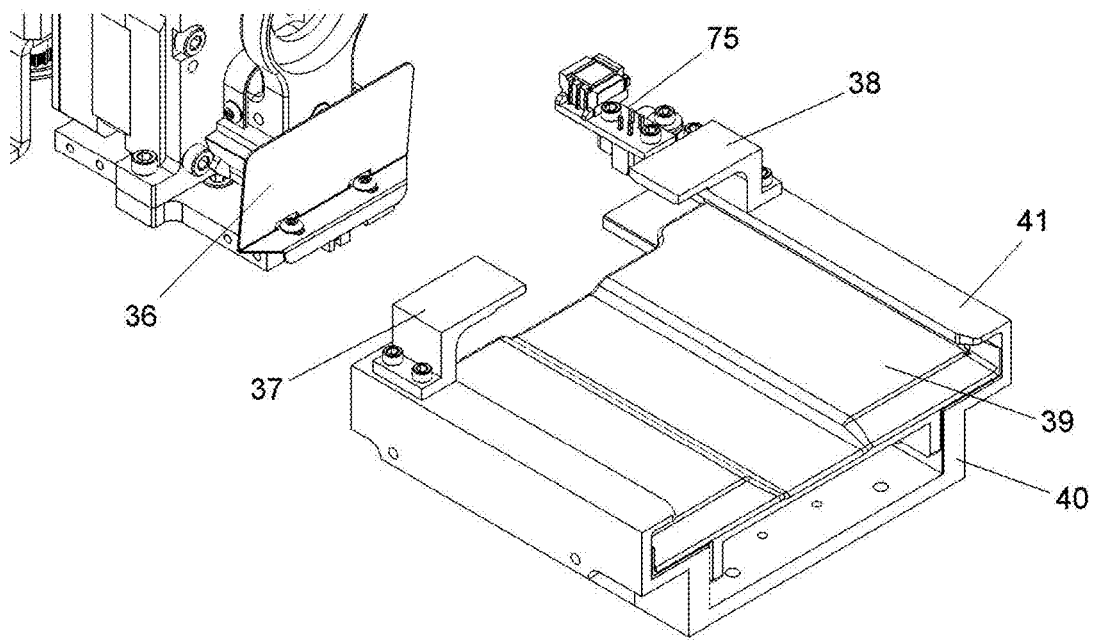
FIG. 20 depicts an exemplary receiving device for the restraint device according to the present disclosure.

Although the components of the restraining device 2 are in other embodiments directly supported by a primary baseplate 19 of the marking system 1 (FIG. 19), the components of the restraining device 2 can be supported by a baseplate 21 that is detachable from (reversibly fixed with respect to) the marking system 2. Such a configuration allows for rapid and consistent (error-free) loading and unloading of an animal into the restraining device 2. In addition, such a configuration allows the marking system 1 to independently accommodate multiple restraining devices 2 so that the marking system 1 can mark a first animal in a first restraining device while the user loads a second animal in a second restraining device, thereby reducing the time required for marking a batch of animals.

Marking Device

As discussed above, the marking device 3 of the present disclosure may in some embodiments be used for making a permanent mark on an animal's body part, such as a mouse tail. To that end, the marking device 3 may in some embodiments include a robot assembly 42 that is driven by a controller, and a marking needle 5 operatively associated with the robot assembly 42.

In one embodiment, the robotic assembly 42 described herein is meant to embrace any robotic configuration that allows positioning of the marking needle 5, whereby actuation of the marking needle 5 marks the substrate. In another embodiment, a robotic assembly positions the marking needle 5 along a y-axis and an R axis. In a further embodiment, the robotic assembly 42 operates or controls operation of the marking needle 5, for example, by actuating a the marking needle 5 to mark the marking substrate. In another embodiment, the robotic assembly 42 positions the marking needle 5 along a Y-axis, a theta axis, and along an R axis.

The robotic assembly 42 (in combination with one or more actuators) may in some embodiments be configured to position a marking needle 5 along any axis. For example, in one embodiment, the robotic assembly 42 can position the marking needle 5 along a linear axes (e.g. Y and/or R), rotational axes (e.g. theta), or a combination thereof.

With the teachings provided herein, the skilled artisan can readily produce robot assemblies 42 that enable a marking needle 5 to move about a desired axis. For example, in one embodiment, the marking needle 5 moves about a linear axis by providing a linear track or can move about any other axis (e.g. rotational axis) by providing a track that follows the desired axis. As another example, in one embodiment, the marking needle 5 moves about a rotational axis by providing a radial arm (e.g. an arm that extends from a pivot point). As another example, in one embodiment, the marking needle 5 moves about a linear axis by providing a piston coupled to a crank pin. As another example, in one embodiment, the marking needle 5 moves about a linear axis by providing a rack and pinion mechanism (where the marking device is attached to a linear rack portion). As another example, in one embodiment, the marking needle 5 moves about a non-circular curved axis by providing a rack and pinion mechanism (where the marking device is attached to the rack portion and the rack/pinion combination is configured therefore). As another example, in one embodiment, the marking needle 5 moves about a rotational axis by providing a rack and pinion mechanism (where the marking device is attached to a circular pinion portion or where the marking device is attached to the rack portion and the rack portion is a circular shape). As another example, in one embodiment, the marking needle 5 moves about a curved axis by providing a crank-slider mechanism (where the slider is a pivoting slider).

The robotic assembly 42 comprises at least a first actuator (also referred to herein as a 'marking actuator') that causes the marking device to make a mark on the substrate, i.e. that 'actuates for making a mark', as used herein. The robotic assembly 42 in one embodiment, further comprises one or more additional actuators for positioning the robotic arm (and marking device) on or about the substrate prior to making a mark on the substrate and/or homing or otherwise disengaging the marking device thereafter.

In one embodiment, the actuator(s) are any type of actuator, for example, a motor, voice coil, screw, piezoelectric device, solenoid, or pneumatic pump. Useful motors include, for example, stepper motors and servo motors. In one embodiment, the actuator is a linear actuator (e.g. Y axis actuator), a rotational actuator (e.g. theta axis actuator), or an actuator that converts from rotational to linear motion or vice-versa (e.g. of the piston type). The actuator (e.g. marking actuator) can cause a robotic arm or marking device thereof to move in a constant motion or a reciprocating motion.

The actuator (e.g. motor) may in some embodiments be optionally controlled by a feedback mechanism, for example, a feedback mechanism that provides positional information of the robotic arm or marking device thereof. Optionally, a feedback mechanism is external to the actuator and comprises a flag fixed to a robotic arm or marking device and a sensor fixed in position with respect to a restraining device (or vice-versa). For example, one or more flags can be provided for each axis of movement such that the marking device can be properly positioned. Optionally, the robot assembly 42 comprises a "substrate" flag (or multiple substrate window flags) on a robotic arm (e.g. an arm actuated by a second actuator), wherein the substrate flag is positioned such that the flag detected by a sensor when the robotic arm has positioned marking device about the substrate (in position for marking). A marking actuator (first actuator) can then be actuated to make a mark (e.g. controlled by a servo motor coupled to a marking device by a reciprocating piston).

Optionally, a feedback mechanism is internal to the actuator. For example, in one embodiment a servo motor is used to provide an actuator (e.g. a first actuator). Generally, a servo motor includes a motor, a feedback device, and a drive. The motor operates on direct current, and is typically hotter and smaller than other motors producing a comparable amount of torque. The feedback device is often an encoder or resolver (e.g. 32 count encoder) mounted on the back of the motor, and the feedback device reports performance information such as motor position and motor speed back to the drive. The servo motor's drive provides current to the motor, and the drive can include a programmable control device (e.g., a controller) which dictates the current in response to the feedback from the feedback device. A servo motor can be controlled by an algorithm such as the proportional-integral-derivative (PID) algorithm. In one embodiment, a servo motor provides properties when used in an actuator (e.g. coupled to a marking device through a reciprocating piston such as a scotch yolk assembly).

Among other various properties taught herein, a servo motor can optionally be provided as a marking actuator to impart a marking system with the ability to stop the marking device's motion at a position that reduces the amount of motion needed by the robotic arm to change positions. For example, a marking device can be fixed to a piston which is coupled to servo motor for reciprocating up/down "marking" motion of the marking device, and the servo motor can be operated with such precision that the needle can stop cyclical movement at top dead center (e.g. upon completion of a mark or a character thereof). This feature eliminates the possibility of dragging the marking device (e.g. needle) on the marking surface without the use of global upward (or Z-axis) movement of the robotic arm itself (e.g. by a second actuator).

Figure 6:
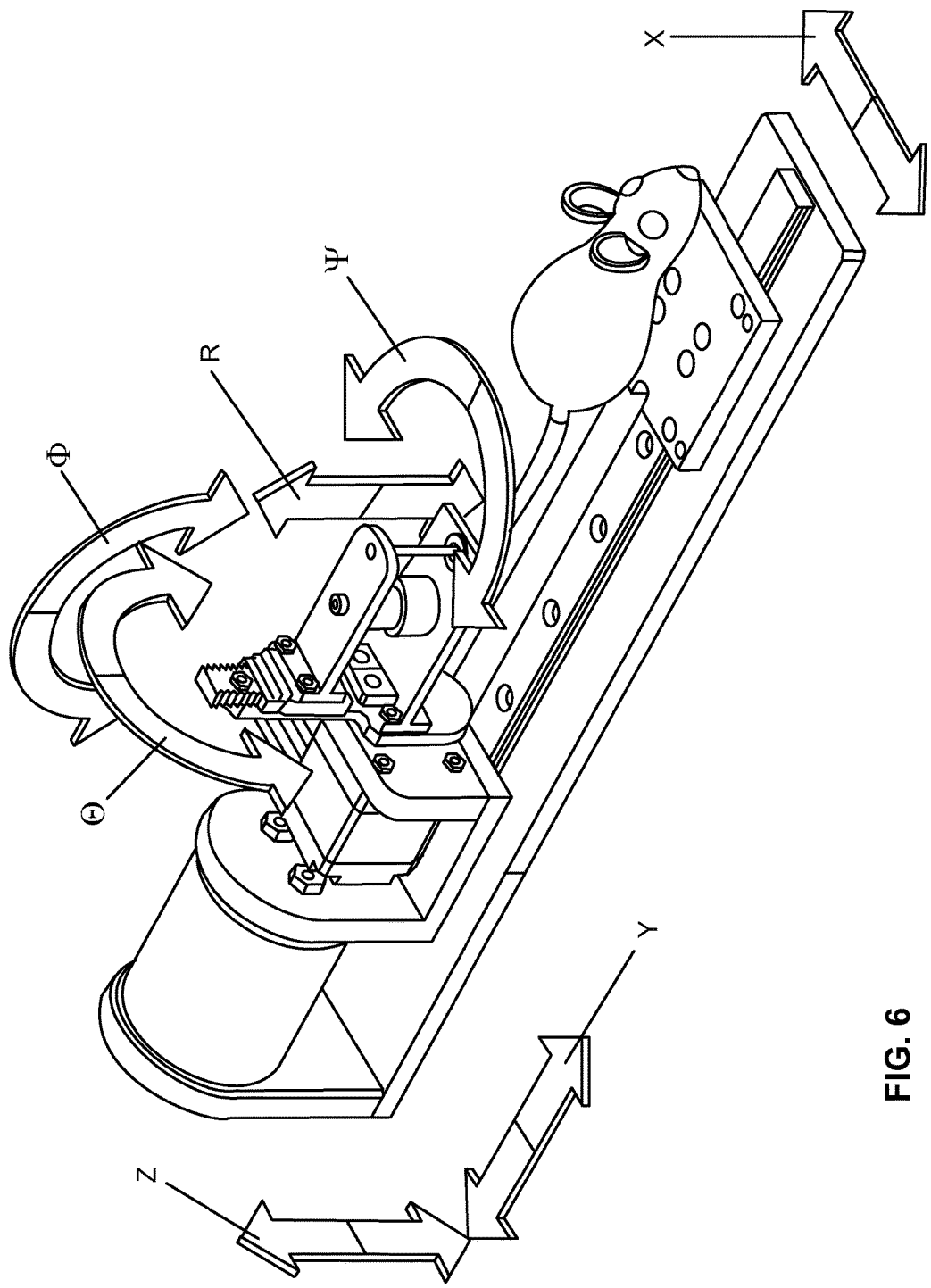
FIG. 6 depicts examples of optional axes about which the marking device and/or robotic arm can be configured to move.
Figure 7A:
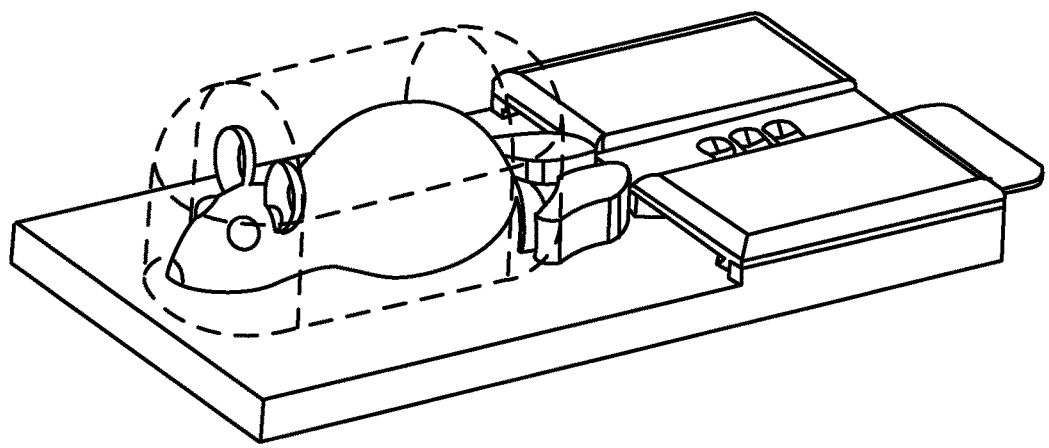
FIG. 7A depicts an exemplary restraining device according to the present disclosure, particularly showing the restraining device having a first part (broken line) that secures the main body of the animal and a second part (solid line) that secures the animal body part to be marked.
Figure 7B:
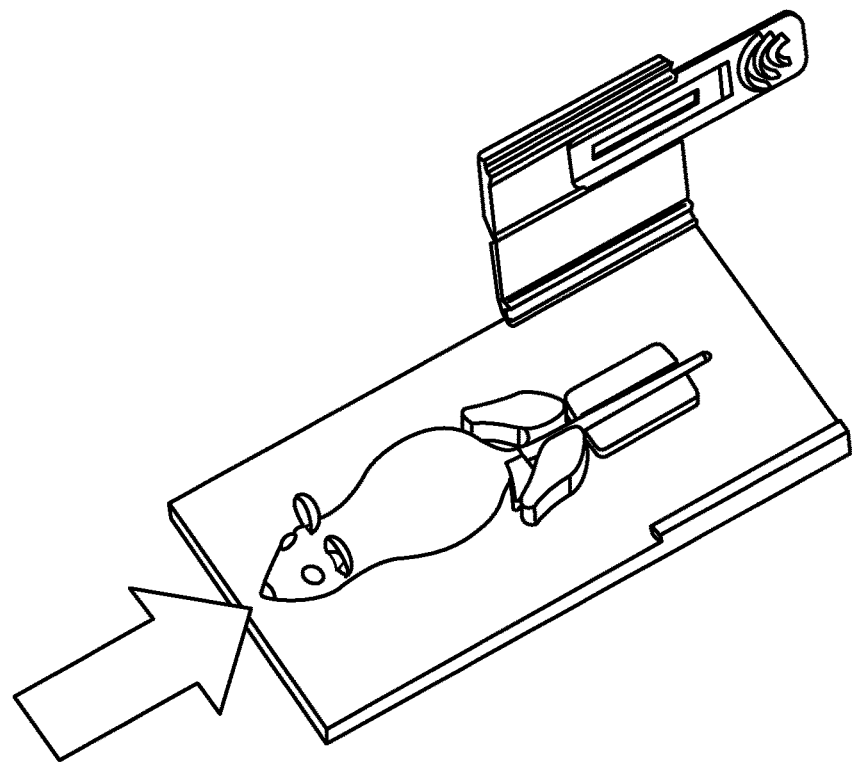
FIG. 7B depicts an exemplary restraining device according to the present disclosure, particularly showing the positioning of the animal by pushing the main body of the animal in the direction of arrow.
Figure 7C:
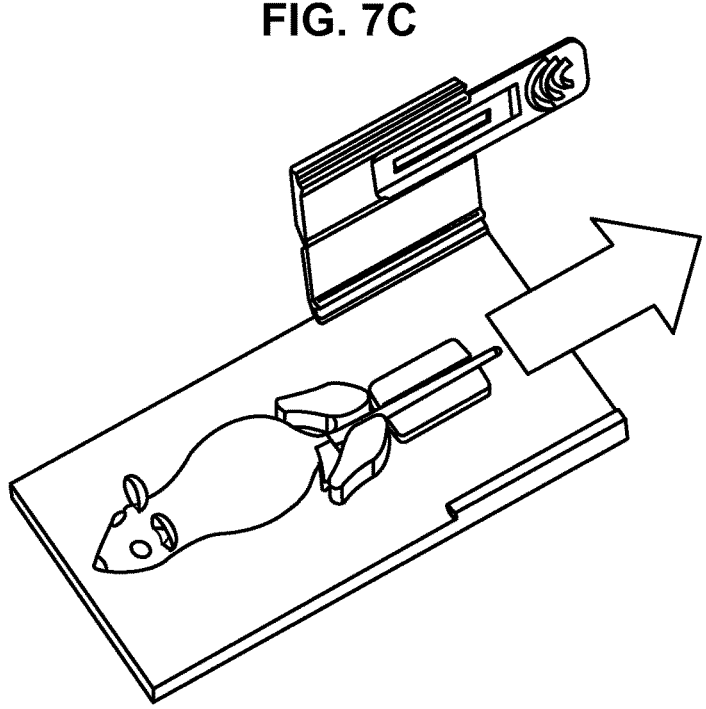
FIG. 7C depicts an exemplary restraining device according to the present disclosure, particularly showing the positioning of the animal by pulling the animal body part to be marked in the direction of arrow.
Figure 7D:
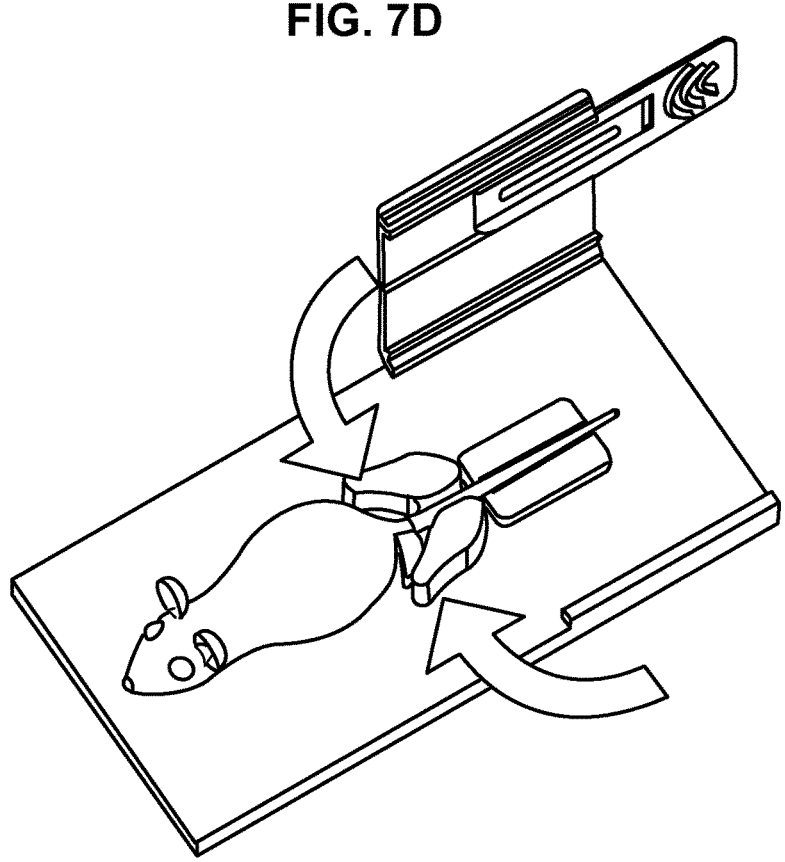
FIG. 7D depicts an exemplary restraining device according to the present disclosure, particularly showing the securing of the animal body part by the restraining device.

In one embodiment the actuator for marking a substrate actuates the marking device 3, and optionally, the robotic assembly 42 along one or more axes or around or about one or more points in space. Optional axes include linear axes and rotational axes, as depicted in FIG. 6 (note that the R axis is defined relative to Theta and Phi and is parallel with the Z axis when Theta and Phi are both equal to zero). Although not depicted in the figure, other optional axes include those that are defined relative to (e.g. normal to) theta and psi or psi and phi.

The skilled artisan will recognize that certain exemplary axes are defined relative to each other in robotic assemblies 42 of marking systems taught herein. For example, although certain descriptions and figures set forth the Z axis as the vertical axis, the skilled artisan will appreciate that this is done to illustrate the invention.

In one embodiment, an actuator actuates movement along a single axis. In another embodiment, an actuator actuates movement along a plurality of axes. Optionally, the marking device and/or robotic arm is capable of moving on plurality of axes, wherein movement along each of a plurality of axes is controlled be a different actuator.

Although the invention contemplates a marking system in which the marking device 3 and/or robotic assembly 42 is capable of moving on one, all, or less than all of the axes defined by FIG. 6 (e.g. independent of other axes). In such embodiments, the marking device 3 can be actuated for making a mark by an actuator that does not move the robotic assembly 42, i.e. does not move the robotic assembly 42 other than the marking device 3 (e.g. by placing the actuator between the arm and the marking device), for example, for providing precision movement of the marking device and/or reduced wear on the actuator compared to an actuator that moves both the marking device 3 and robotic assembly 42 simultaneously.

Useful robot assemblies 42 of the present invention can an actuator that causes a marking needle 5 (of the marking device 3) to contact the substrate. Optionally, the actuator causes a marking member to pierce the substrate (e.g. to inject a tattoo). Optionally, the actuator causes the marking member to move in a reciprocating (or 'cyclical') motion, for example, by providing a motor coupled to a marking device by a piston. For example, where the mark is produced by one or more needles piercing the skin of the animal to be marked, the needle can enter the skin and exit the skin along the same path, for example, by retracting from the skin, minimizing spread of the mark and tissue damage.

Figure 25:
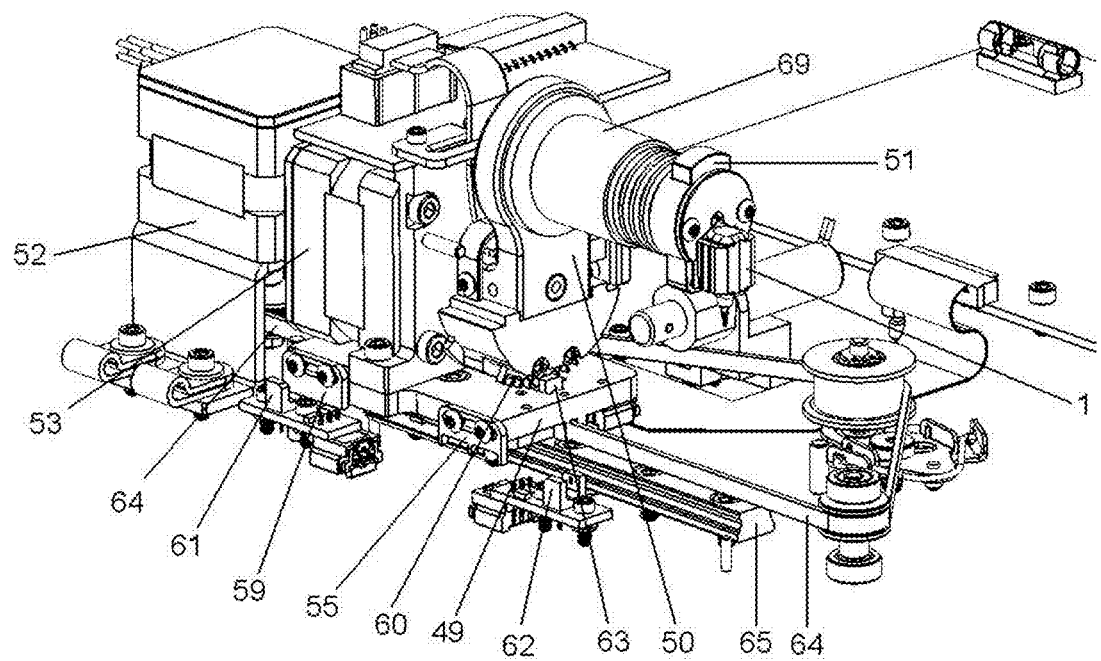
FIG. 25 depicts an exemplary robot assembly according to the present disclosure.
Figure 26:
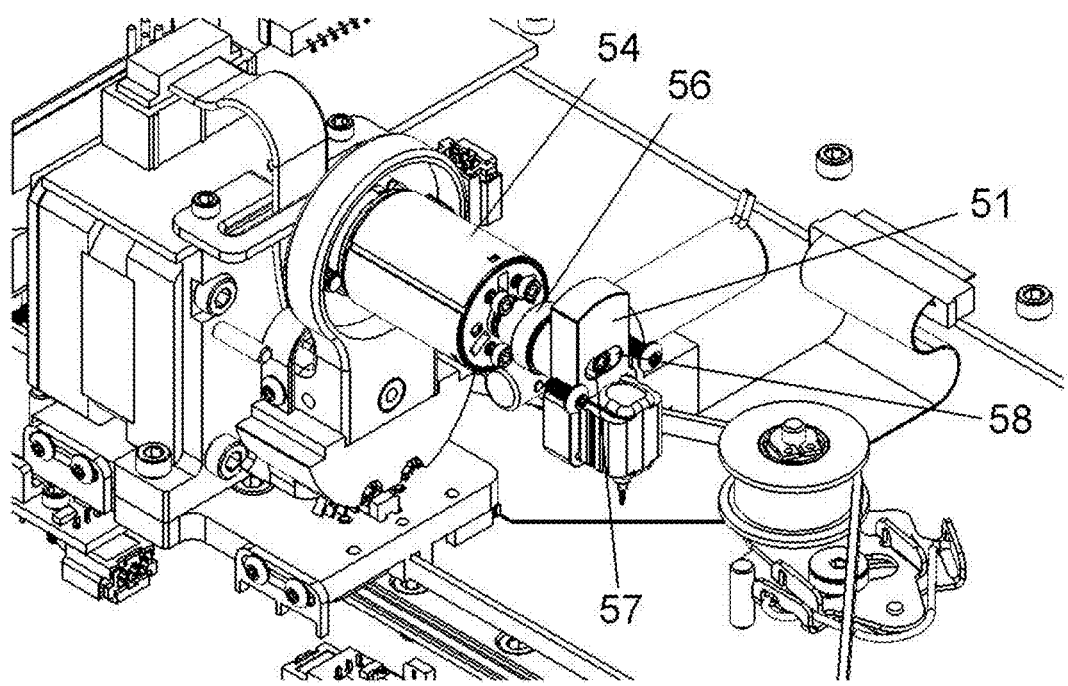
FIG. 26 depicts an exemplary robot assembly according to the present disclosure.
Figure 27:
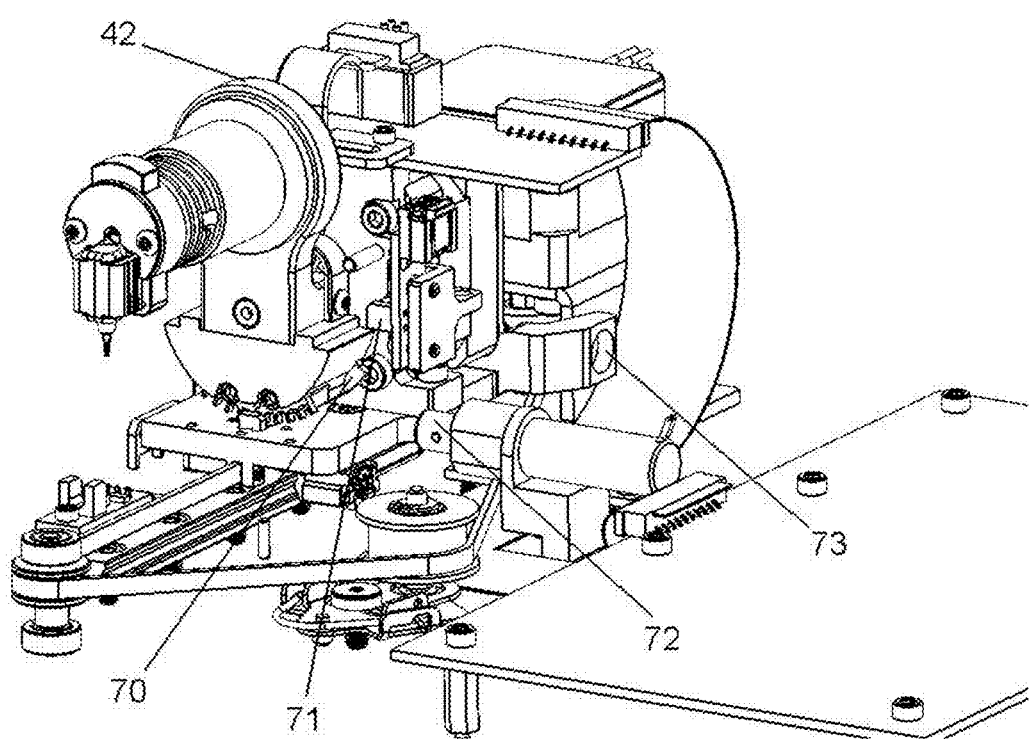
FIG. 27 depicts an exemplary robot assembly according to the present disclosure.
Figure 28:
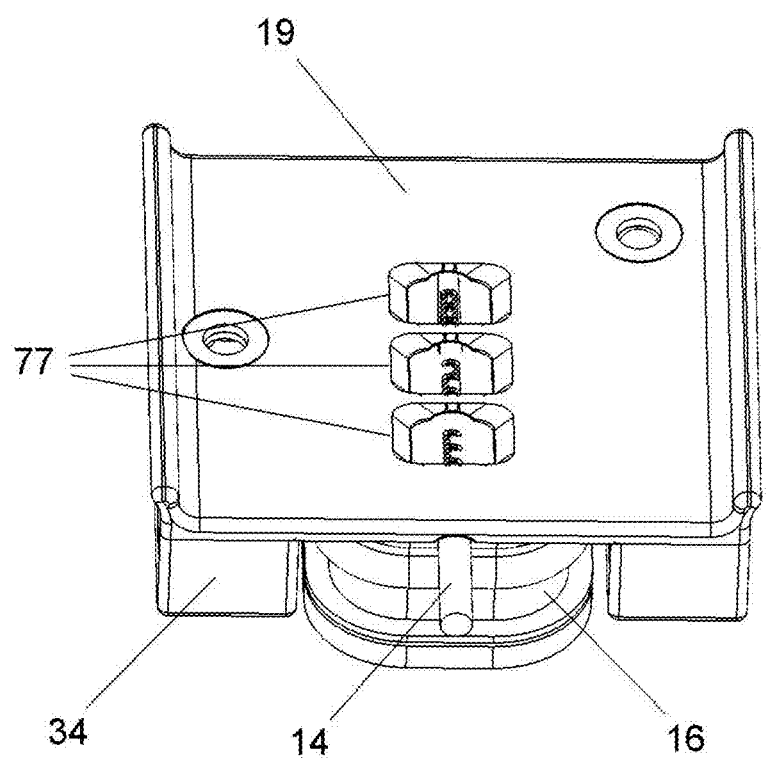
FIG. 28 depicts an exemplary body part plate assembly and spring-loaded tail plate assembly according to the present disclosure.
Figure 29:
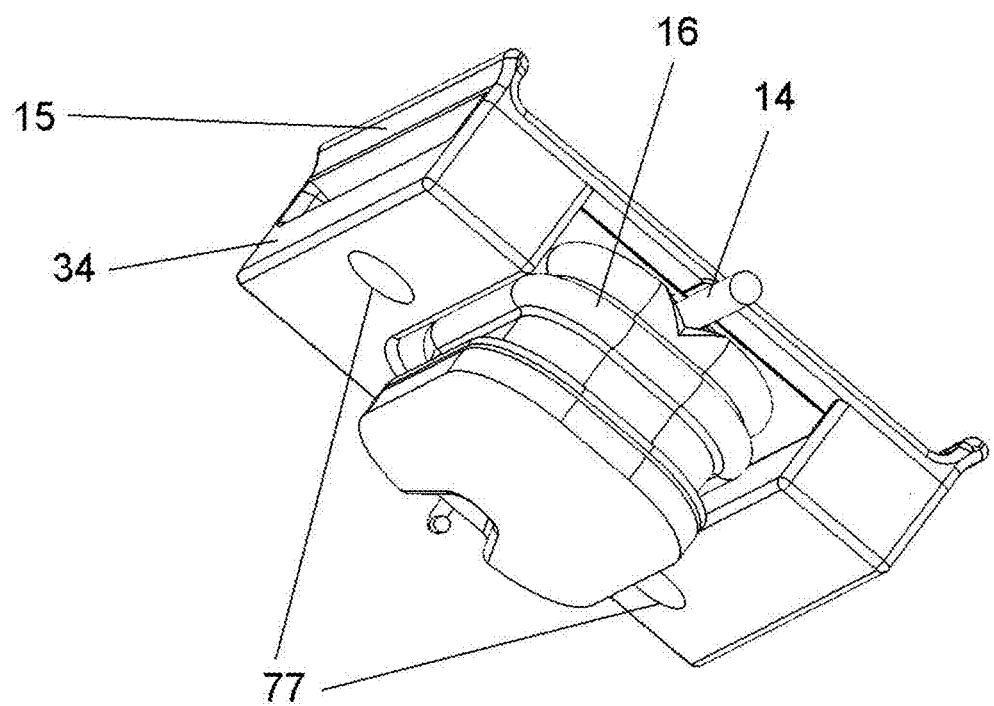
FIG. 29 depicts an exemplary a body part plate assembly and spring-loaded tails plate assembly according to the present disclosure.
Figure 30:
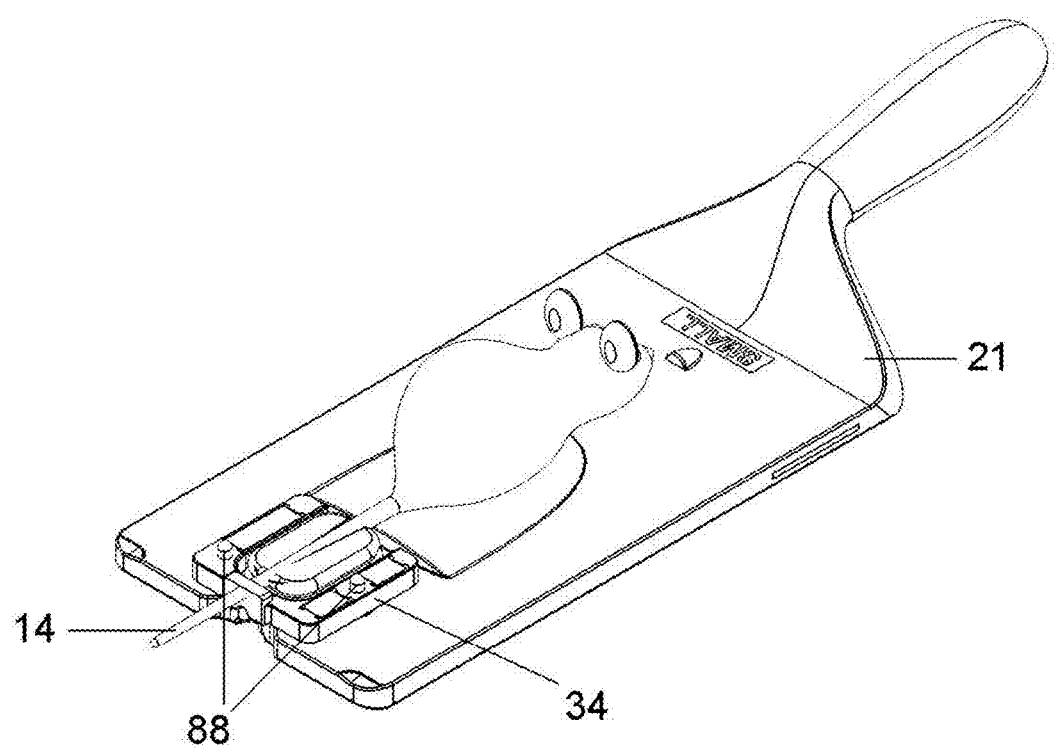
FIG. 30 depicts an exemplary restraining device according to the present disclosure.
Figure 31:
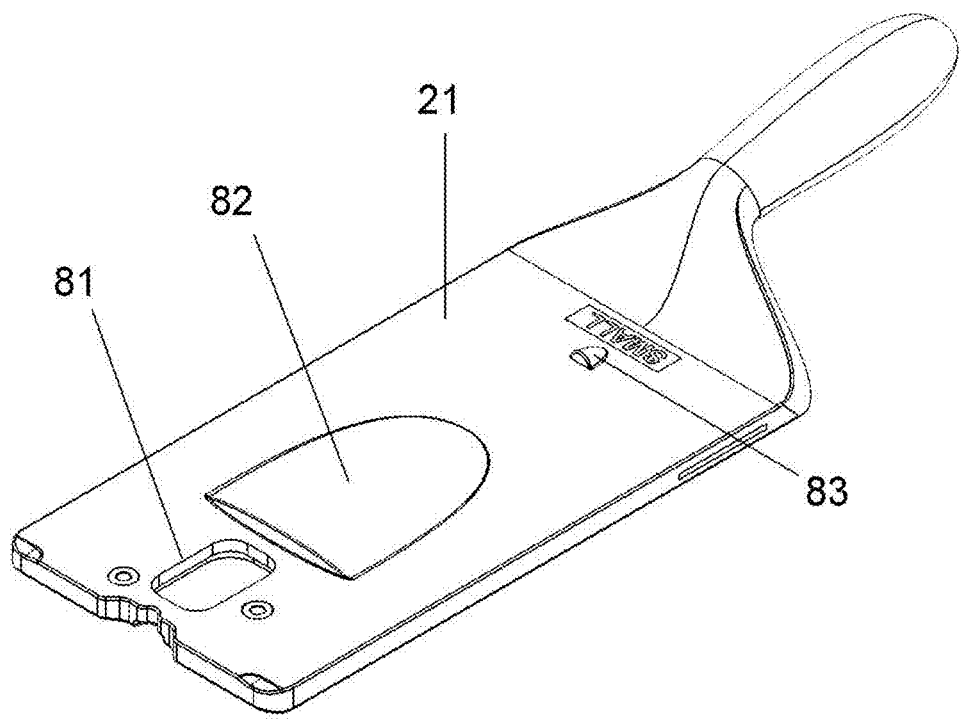
FIG. 31 depicts an exemplary baseplate according to the present disclosure.

In one embodiment, the robotic assembly 42 comprises at least a first actuator that actuates the marking device for marking a mark (e.g. R or Z axis), and further comprises at least a second actuator (e.g. X, Y, Z, Phi, or theta axis) for positioning the robotic arm (and marking device). Optionally, the first actuator(s) is/are connected between the robotic arm and the marking device. This configuration allows more rapid placement of the marking device (i.e. position and angle with respect to the body part to be marked), more accurate and discrete marking, and/or less wear on the marking actuator (e.g. as depicted in FIG. 1 and FIG. 25). Such a robot assembly is optionally combined in a marking system with a body part restraint, such as a body part plate assembly. For example, such a robot assembly 42 is useful in combination with body part (e.g. tail) plate assembly 20 with conformative biasing means 46 and/or one or more operation windows 19.

In one embodiment, the robotic assembly 42 comprises at least a first actuator (e.g. reciprocating piston coupled to a motor such as a servo motor) that actuates the marking device for marking a mark (e.g. R or Z axis), and further comprises at least a second actuator (e.g. X or theta axis) and at least a third actuator (e.g. Y or Phi) for positioning the robotic arm (and marking device). Optionally, the first actuator(s) is/are connected between the robotic arm and the marking device, (e.g. as depicted in FIG. 1 and FIG. 25). For example, the first actuator(s) can be actuated (e.g. cyclically actuated) for making a mark and the second and third actuators can be manipulated during a method of making a mark in order to make a make with a desired shape, pattern, character, or set of characters. Such a robot assembly 42 is optionally combined in a marking system with a body part restraint, such as a body part plate assembly. For example, such a robot assembly is useful in combination with body part (e.g. tail) plate assembly with conformative biasing means and/or one or more operation windows.

In another embodiment, the robot assembly 42 comprises first and second actuators and the first actuator(s) actuates the marking device along the R or Z axis. In a further embodiment, the first actuator comprises a servo motor (e.g. PID controlled) coupled to a piston (e.g. scotch yolk). In yet another embodiment, the robot assembly comprises first and second actuators and the first actuator(s) actuates the marking device along the X, Y, Z, or theta axis.

In one embodiment, the robot assembly 42 comprises first and second actuators and the first actuator(s) actuates the marking device along the R or Z axis and the second actuator(s) actuates the marking device (and robotic arm) along the X, Y, Z, Phi, or theta axis. For example, the first actuator can actuate the marking device for making a mark along the R axis and the second device can actuator the marking device along the theta axis. Optionally, the first actuator comprises a servo motor (e.g. PID controlled) coupled to a piston (e.g. scotch yolk).

In one embodiment, the robot assembly 42 comprises first and second actuators and the first actuator(s) actuates the marking device along the X, Y, Z, or theta axis and the second actuator actuate(s) the marking device along the X, Y, Z, or theta axis.

In one embodiment, the robot assembly 42 comprises first, second, and third actuators and the first actuator(s) actuates the marking device along the R or Z axis, the second actuator(s) actuates the marking device (and robotic arm) along the X or theta axis, and the third actuator(s) actuates the marking device (and robotic arm) along the Y or Phi axis. Optionally, the first actuator comprises a servo motor (e.g. PID controlled) coupled to a piston (e.g. scotch yolk).

In one embodiment, the marking device 3 is actuated by the first actuator (e.g. along the R, X, Y, Z, or theta axis) for positioning the marking device about (e.g. flush with) the substrate (e.g. skin or dermis), and then cyclically actuated (e.g. back and forth along R, X, Y, Z, or theta axis) to contact the substrate one or more times (e.g. repeatedly contacting or piercing into the substrate). Optionally, the first actuator comprises a servo motor (e.g. PID controlled) coupled to a marking device through a piston (e.g. scotch yolk).

In one embodiment, the actuator(s) of the robot assembly 42 are configured to make a mark on a cylindrical or conical substrate. With the teachings provided herein, one skilled in the art can now provide such a configuration. For example a mark can be made on such a substrate by providing an actuator that actuates a marking device about a rotational axis (e.g. theta axis). As another example, a mark can be made on such a substrate by providing a plurality of independently-actuated marking members (e.g. needles) that are patterned about the inside of a circular arc or other arc.

To make a permanent tattoo, the marking needle 5 is actuated to penetrate through a media transfer assembly 23 where it picks-up a pigment, and continues into the dermis of the marking substrate where the pigment is deposited before the needle returns to pick-up more pigment, and the controller-operated robotic assembly 42 advances the marking needle 5 to the next tattoo target area where the cycle is repeated.

In order to produce a legible and permanent tattoo, it is sometimes necessary to deposit the pigment at certain depth within the dermal layer of the marking substrate. If the marking needle 5 does not penetrate deep enough, i.e. beyond the epidermis, the tattoo may slough-off and fade over time. If the marking needle 5 penetrates beyond the dermis, some or all of the pigment may be transferred to or leach into the vascularized layers of the hypodermis where interstitial fluids will promote migration of the pigment, thus compromising the resolution of the tattoo characters and/or allowing them to occlude. Delivery of a pigment to the vascularized layers may in some embodiments also result in endangering the animal or allowing foreign contaminants to enter the animal's lymphatic system and prevent the animal from being useful in laboratory experiments.

Figure 42:
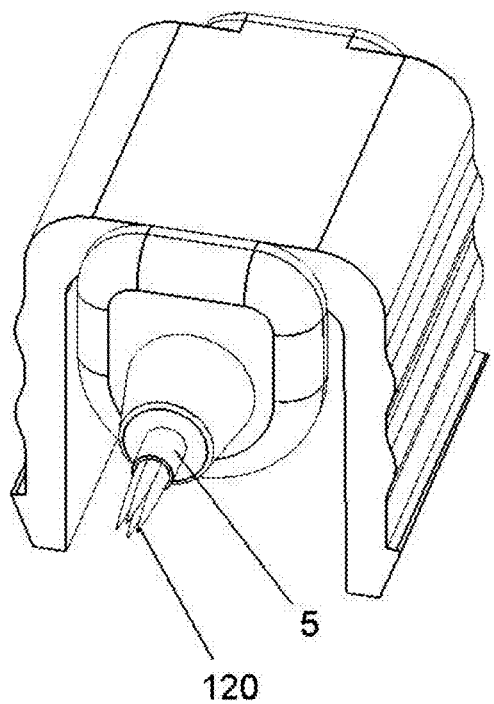
FIG. 42 depicts an exemplary four-tip marking needle coupled to an exemplary needle cartridge according to the present disclosure.
Figure 43:
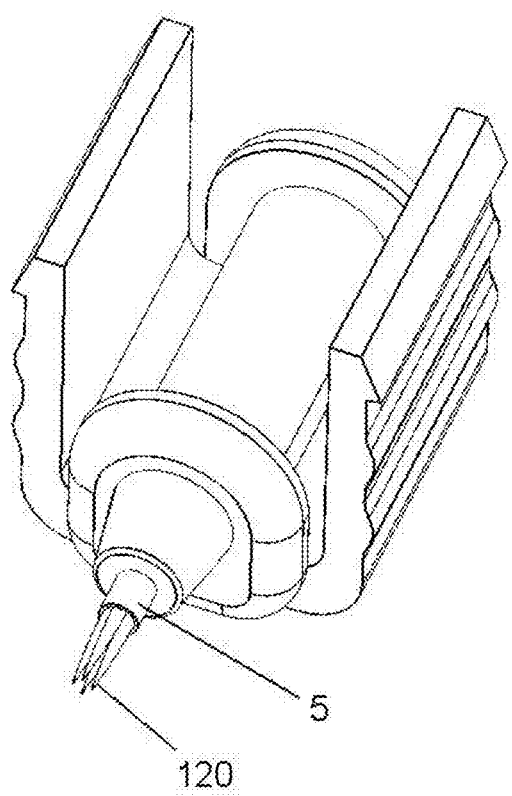
FIG. 43 depicts an exemplary four-tip marking needle coupled to an exemplary needle cartridge according to the present disclosure.
Figure 44:
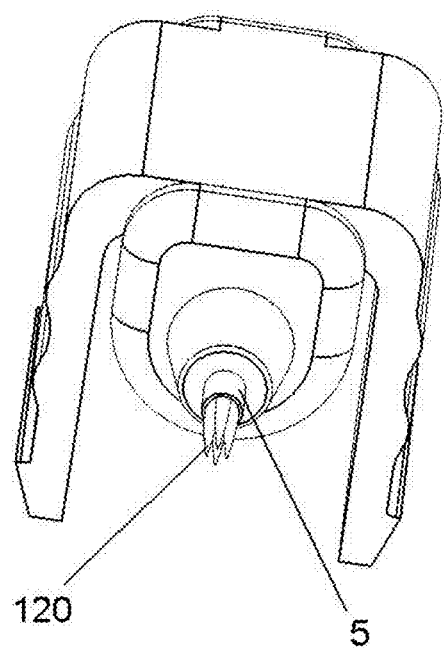
FIG. 44 depicts an exemplary three-tip marking needle coupled to an exemplary needle cartridge according to the present disclosure.

To transfer pigment into the dermis in sufficient quantity to be easily legible by the unaided eye (e.g. boldness of font) may in some embodiments be achieved by making multiple passes of a singular needle tip, or it may in some embodiments more optimally and efficiently be done using multiple needle tips 120 that are grouped together, as illustrated in FIGS. 42-44. Those tips 120 may have a fixed and similar length that, in combination, create a quasi-basin between the needle tips wherein a greater volume of pigment may in some embodiments be captured as said grouped needle tips traverse through the media transfer device and carry the pigment forward into the skin. When a marking needle with multiple tips is used in the disclosed marking system, it is desirable in some embodiments for the multiple tips to be co-planar. In one embodiment, the multiple tips 120 of the marking needle 5 have a tip length deviation of no more than about ±0.001" (±25 microns). Moreover, it is desirable in some embodiments for the multiple needle tips 120 to be centered tightly. In one embodiment, the multiple needle tips 120 of the marking needle 5 have a tip concentration deviation of no more than about ±0.005" (±125 microns).

To transfer pigment into the dermis with less load force on the needles and less discomfort to the animal may require the use of sharp needle tips. Depending on the number of tattoos produced, needles may need to be replaced periodically. Needles may also require replacement in those cases where cross-contamination between animal populations must be prevented and needle sharing is not permissible. In other instances, if needles become damaged (e.g. the tips become bent), they need to be replaced. Regardless of the reason behind the need to change needles, it is preferred that the design be such that the replacement is easily done by the user of the tattooing system. Most noteworthy however is that it is desirable that in making a needle change, minimum compromise be made in the repeatability of the needle tip length deviation and needle tip concentration deviation with respect to the marking device, particularly if no closed-loop feedback relative to the needle tip penetration and lateral positioning into the dermal layer is provided.

In order to repeatably position the marking needle 5 during needle replacement, the marking device 3 may include a needle cartridge 92 to which the marking needle 5 may in some embodiments be accurately coupled. Turning now to FIGS. 35-38, a non-limiting embodiment of the needle cartridge 92 is illustrated as including a reference feature 93 configured to precisely mount the needle cartridge 92 onto the marking device.

Figure 39:
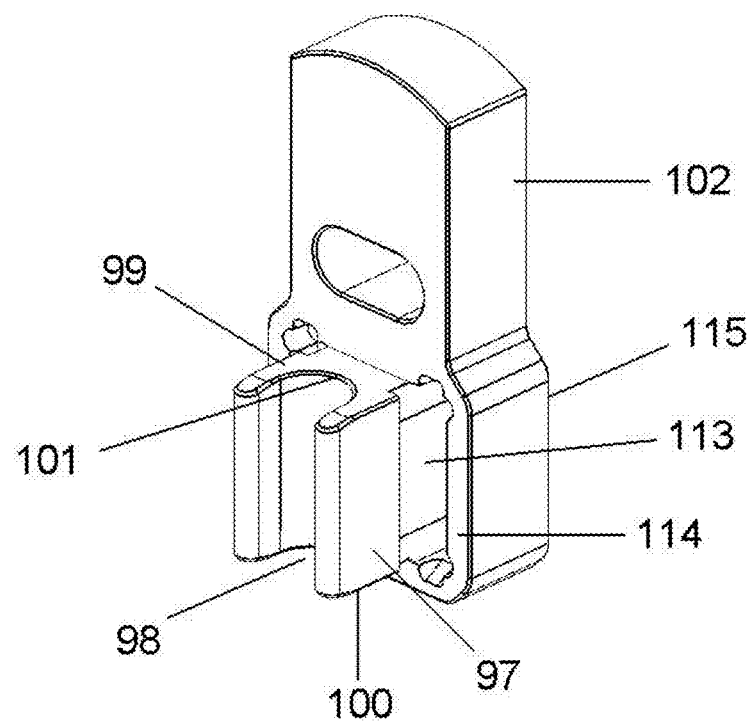
FIG. 39 depicts an exemplary mounting mechanism for the needle cartridge according to the present disclosure.
Figure 40:
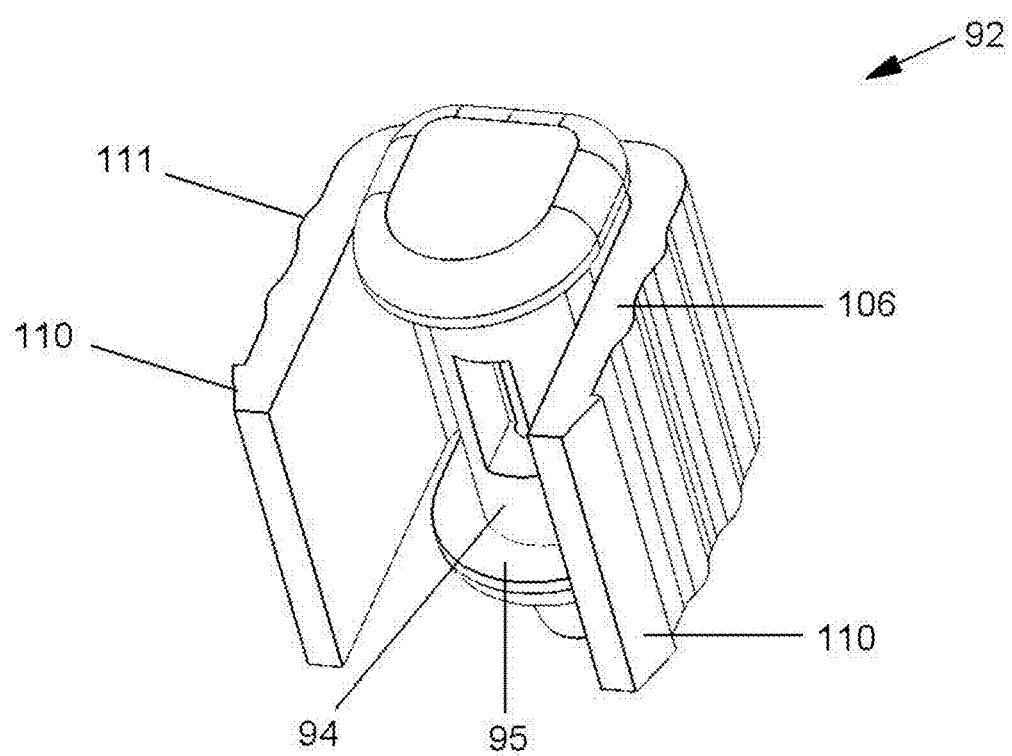
FIG. 40 depicts an exemplary needle cartridge in rear perspective according to the present disclosure, particularly illustrating the locking feature.

As illustrated in FIGS. 35-38, the reference feature 93 of the needle cartridge 92 includes a locating cylinder 94 having a cylindrical surface that is at least partially exposed. The locating cylinder 94 extends between two end plates (95, 96). As illustrated in FIG. 39, the needle cartridge 92 may be mounted to the marking device 3 through a docking member 97 that is coupled to a scotch yoke 102 of the marking device 3. The docking member 97 defines a receiving slot 98 extending between a top surface 99 and a bottom surface 100.

To mount the needle cartridge 92, the locating cylinder 94 is inserted into the receiving slot 98 of the docking member 97 until its cylindrical surface conformingly engages a terminal end 101 of the receiving slot 98. With the locating cylinder 94 in place, the two end plates (95, 96) also conformingly engage the top and bottom surfaces (99, 100) of the docking member 97, thereby completely fixing the position of the needle cartridge on the docking member. As a result, if the needle cartridge 92 needs to be replaced during a marking process, the replacement needle cartridge can be precisely mounted in the same position for continued marking without significantly affecting the consistency and overall quality of the marks produced.

In a refinement, the locating cylinder 94 may also provided housing to the marking needle 5. For example, the locating cylinder 94 may include a center bore in which the marking needle 5 may be positioned using fixturing and fixed into place using an adhesive such as an epoxy.

Alternatively, the marking needles 5 may in some embodiments be positioned and fixed in place by molding the locating cylinder 94 about the marking needle 5. This can be achieved according to known processes in the injection molding industry where threads, pins, and even needles are inserted into a mold cavity and a surrounding housing is injection molded into place.

In addition to the reference feature 93 described above, the needle cartridge 92 may further include a locking feature 105 configured to lock the needle cartridge 92 onto the marking device 3. Still referring to FIGS. 35-38, the locking features 105 of the needle cartridge 92 may include a locking clip 106 having a flexible U-shaped sidewall 107 extending between two ends (108, 109). Each of the two ends (108, 109) includes at least one outwardly protruding locking teeth 110. The locking clip 106 further includes a plurality of optional gripping ribs 111 disposed on an exterior surface 112 of the U-shaped sidewall 107.

To lock the needle cartridge 92, the scotch yoke 102 of the marking device 3 includes a receiving opening 113 extending between front and back surfaces (114, 115), as illustrated in FIG. 39. When the reference feature 93 of the needle cartridge 92 is received in the docking member 97, the locking tooth 110 is pressed toward each other as they are inserted through the receiving opening 113 of the scotch yoke 102. The needle cartridge 92 is dimensioned so that the locking teeth 110 of the locking clip 106 clears the back surface 115 of the receiving opening 113 when the locating cylinder 94 is conformingly received in the receiving slot 98 of the docking member 97. Due to the outward biasing force of the locking clip 106, the locking tooth 110 remains firmly engaged to the back surface 115 of the receiving opening 113, thereby locking the needle cartridge 92 onto the marking device 3.

One feature of the disclosed marking system is deposition of pigment with improved depth precision, such as by using the restraining device 2 and/or marking device 3 disclosed herein. For purposes of tattooing a mouse tail, the marking device 3 may need to drive the marking needle 5 to the desired dermal layer depth, for example, 150-250 microns for young mice, and 200-300 microns for adult mice.

In one embodiment, the marking system comprises marking needles that are capable of penetrating the marking substrate epidermis and transfer the pigment from the marking needle into the dermal layer.

In one embodiment, the marking system is configured to deposit a pigment into the marking substrate at a depth of;
 a. 150-250 microns for young mice.
 b. 200-300 microns for adult mice.
 c. 200-250 microns regardless of the age of the mice.

To meet this depth requirement and to produce a mark of sufficient font size to be legible to the unaided eye, the mark character must partially wrap the circumference of the tail and be at the target depth. This latter circumferential depth requirement may in some embodiments be achieved by pivoting the marking needle 5 during the tattooing process about an arc whose center is coincident with the center of the mouse tail diameter, thus keeping the marking device normal to the surface of tail at all times. Maintaining the tattoo depth therefore is attained by programming the system processor to control the position of the robotic assembly 42 (whereon is attached the marking needle 5), and providing a mounted needle having a length controlled to ±25 microns and lateral centering within ±125 microns with respect to its pivoting axis.

It is conceivable that a needle cartridge 92 may in some embodiments be alternatively designed to mount directly to the marking device 3 and forego the reference and/or locating features (93, 105). This configuration may be suitable and sufficient for low-volume tattooing requirements.

In the case of high-volume throughput requirements, it may be desirable to design a system wherein multiple needle housings are mounted into, for example, a turret which the marking system may in some embodiments access to replace needles upon command or on a preprogrammed basis.

Tail Gauge

The marking system of the present disclosure may in some embodiments further include an optional measuring device 125 to measure the size of the marking substrate. For example, the measuring device 125 may in some embodiments be a mechanical gauge 126, such as a tail gauge, that can be used to measure the girth of a mouse tail for purposes of determining the appropriate restraining device and marking needle necessary to achieve the appropriate depth of dermal layer placement of the marking pigment. An actual girth measurement is a more accurate and repeatable means of determining the appropriate restraining device and marking needle combination than say age or weight of the animal. The girth of the tail at a particular age or weight will vary greatly depending on a number of factors, for example strain of mouse, gender, diet, litter size, etc.

In one embodiment, the girth of the mouse tail nearest the body is used to determine the optimal combination of needle length and supporting v-groove in the restraining device to satisfy the marking target depth.

Figure 41:
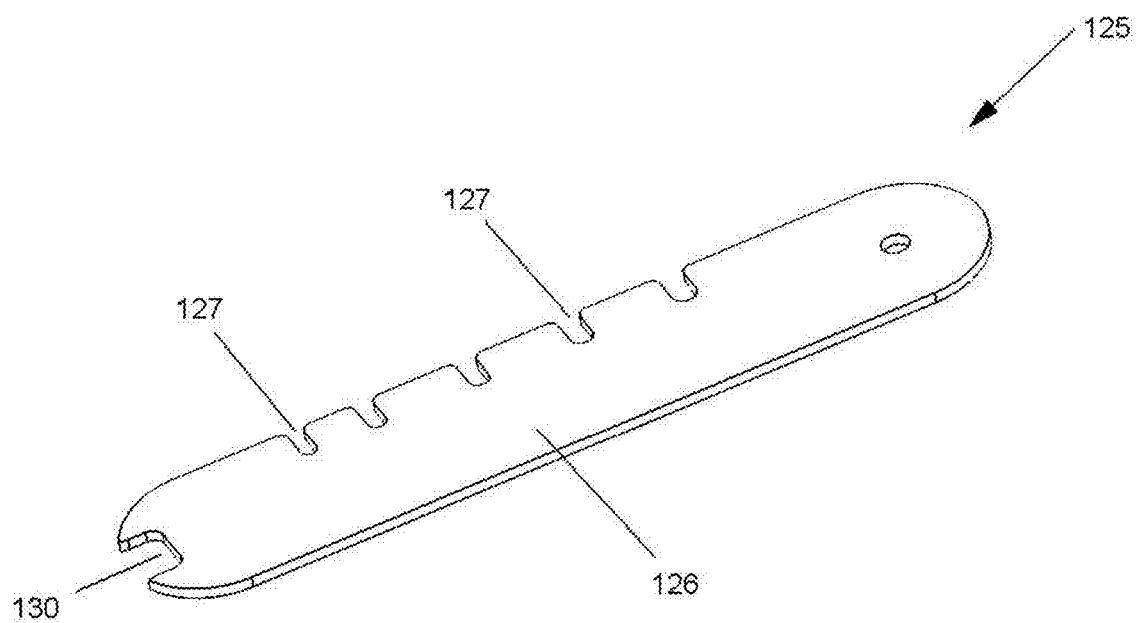
FIG. 41 depicts an exemplary needle cartridge extraction tool according to the present disclosure.

In one non-limiting embodiment illustrated in FIG. 41, the girth of the substrate body part is measured using a tail gauge 126 having a plurality of grooves 127 with incrementally increasing widths that correspond to the optimal combination of needle length and restraining device.

Optionally, the grooves 127 of the tail gauge are or are about 0.094", 0.105", 0.115", 0.128", and 0.140" in width, each approximately corresponding to the age and weight ranges of mice shown in the table below.

| Groove Width | | Mouse | |
| --- | --- | --- | --- |
| (in.) | (mm) | Weight (grams) | Age (weeks) |
| 0.094 | 2.39 | <8 | <2 |
| 0.105 | 2.67 | 8-10 | 2-3 |
| 0.115 | 2.92 | 11-15 | 3-4 |
| 0.128 | 3.25 | 16-22 | 4-5 |
| 0.140 | 3.56 | 23-30 | 5-6 |

Optionally, the measurement is made manually by the user lowering the grooved gauge over the tail nearest the body of the mouse, and finding the smallest groove 127 that fits (i.e. drops) comfortably over the girth of the tail.

Figure 50:
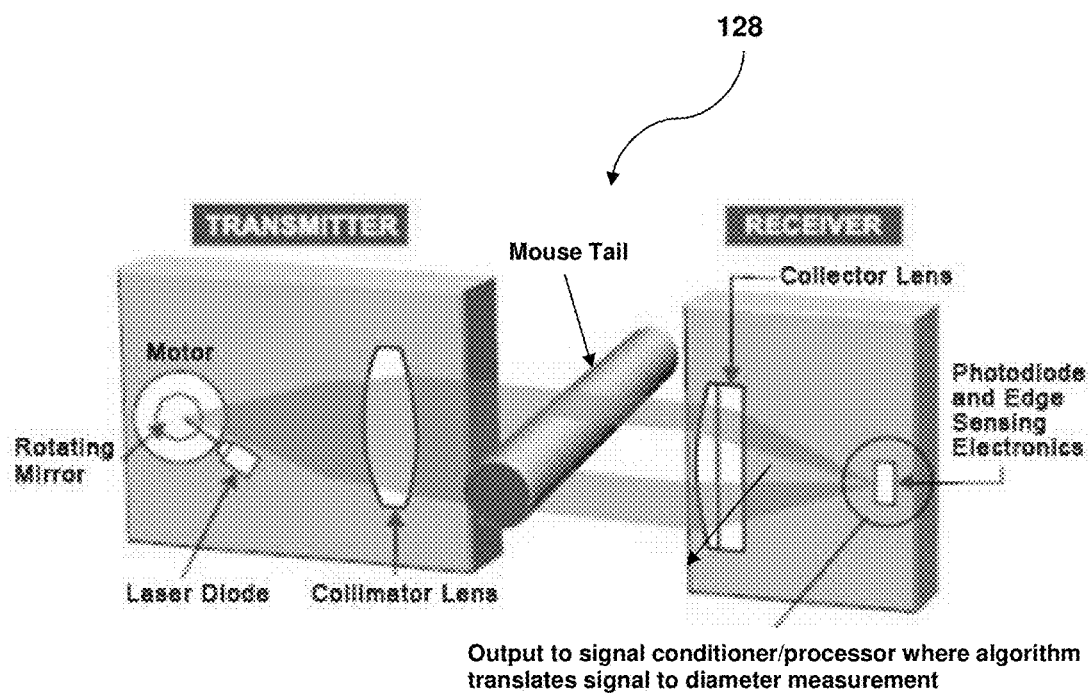
FIG. 50 schematically depicts an exemplary tail size measuring gauge based on laser beam according to the present disclosure.

The girth measurement may in some embodiments alternatively be made in non-contact fashion by the marking system. In one embodiment, the marking system includes a laser-based measuring device 128 that measures the girth of the body part by using a laser light curtain and a receiver that is incorporated into the system, as schematically illustrated in FIG. 50.

In a refinement of this embodiment, the measurement is made manually, by the user introducing the body part into the path of the light curtain.

In another refinement of this embodiment, the measurement is made automatically by breaking the path of the light curtain when the user introduces the restraining device into the marking system.

Needle Removal Tool

A needle removal tool 130, useful according to the present disclosure, may be optionally provided to remove the needle cartridge 92 from the marking device 3. For example, when the needle cartridge includes locking clips (e.g. pinch arms) that enable easily pushing-on and locking the needle cartridge into place, the marking system may include an appropriately sized forked tool 130 for removal of the cartridge housing from the marking system, as illustrated in FIG. 49.

Figure 49:
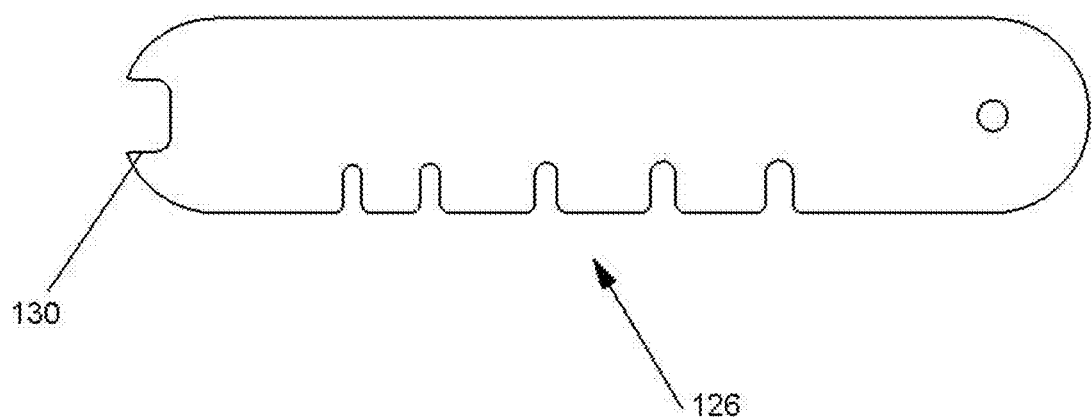
FIG. 49 depicts an exemplary measuring gauge according to the present disclosure, particularly illustration the optional integration of the measuring gauge and the needle cartridge extraction tool.

Optionally, the forked tool 130 may be integrated with measuring tail gauge 126 used to determine the girth of the substrate body part, as illustrated in FIGS. 41 and 49.

System Controller

In one embodiment, the controller 4 described herein is any controller that is able to control the position/movement of the robotic arm relative to the robot assembly and/or for actuating the marking device, for example a computer or microprocessor, or computer-interfacing device.

The present invention contemplates a computer program (e.g. recorded on a computer readable medium) comprising instructions for manipulating a robotic assembly to perform a function or method taught herein.

The controller manipulates the robotic assembly 42 to position the marking device 3 about the substrate and mark the substrate. The controller 4 can determine the position of substrate by existing instructions that informs the controller of the substrate's position.

In one embodiment, the controller 4 contains a program that is responsive to one or more feedback mechanisms (e.g. sensors).

In another embodiment, the controller 4 contains an algorithm such as PID to control one or more servo-based actuators (e.g. marking actuators).

The system controller 4 provides positioning and character mapping instructions to the marking needle for producing the desired substrate marking. The direction of needle travel relative to the substrate to be marked can influence the quality of the character marking. Traveling in the direction of the lay of the substrate animal scales or hairs enhances the flow and presence of ink available to the marking needle. For example, in one embodiment, the marking system generates the characters to be used in substrate marking by working from the proximal end of a mouse tail (i.e. closest to the body part) to the distal end of the appendage (i.e. tip of the tail).

Character marking onto a substrate whose geometry is non-uniform becomes increasingly difficult the smaller the substrate, particularly since the character marking must remain sufficiently large and cannot scale-down commensurate with the substrate size if it is to be read with the unaided eye. Maintaining sufficient ink available to the marking needle becomes a challenge in smaller substrate geometries. For example, in a mouse tail, it is more difficult sustaining sufficient ink in the distal end of the tail than in the proximal end, particularly as a function of time as the marking pigment begins to dry or spread to larger areas. The order of character marking (i.e. working from the smaller girth to the larger girth of a tail) can be used to ensure that sufficient ink is present when the marking is initiated and subsequently when the last character is completed. In one embodiment, the marking system generates the characters to be used in substrate marking by working from the distal (tip) end of the body part to the proximal end of the appendage nearest the main body.

The system processor 4 may in some embodiments also be programmed to pre-perforate the media transfer device in a limited number of places on each character prior to beginning the final (high-density resolution) character marking. This ensures that sufficient ink is present in each character position as opposed to expending most of the ink at the initial character and being left ink-starved by the end of the character marking series. In one embodiment, the marking system uses the marking needle to pre-perforate the media transfer device at each character location prior to commencing the complete character marking.

Media Transfer Assembly

The marking system further includes a media transfer assembly 23 to deliver a pigment to the marking substrate. In one embodiment, the marking needle 5 pierces through the media transfer assembly 23, contacts the pigment, and drives it forward as it penetrates the mouse tail to the depth of the dermal layer wherein the pigment is deposited before retracting the marking needle 5 from the media transfer assembly 23 and repeating the process.

Figure 5:
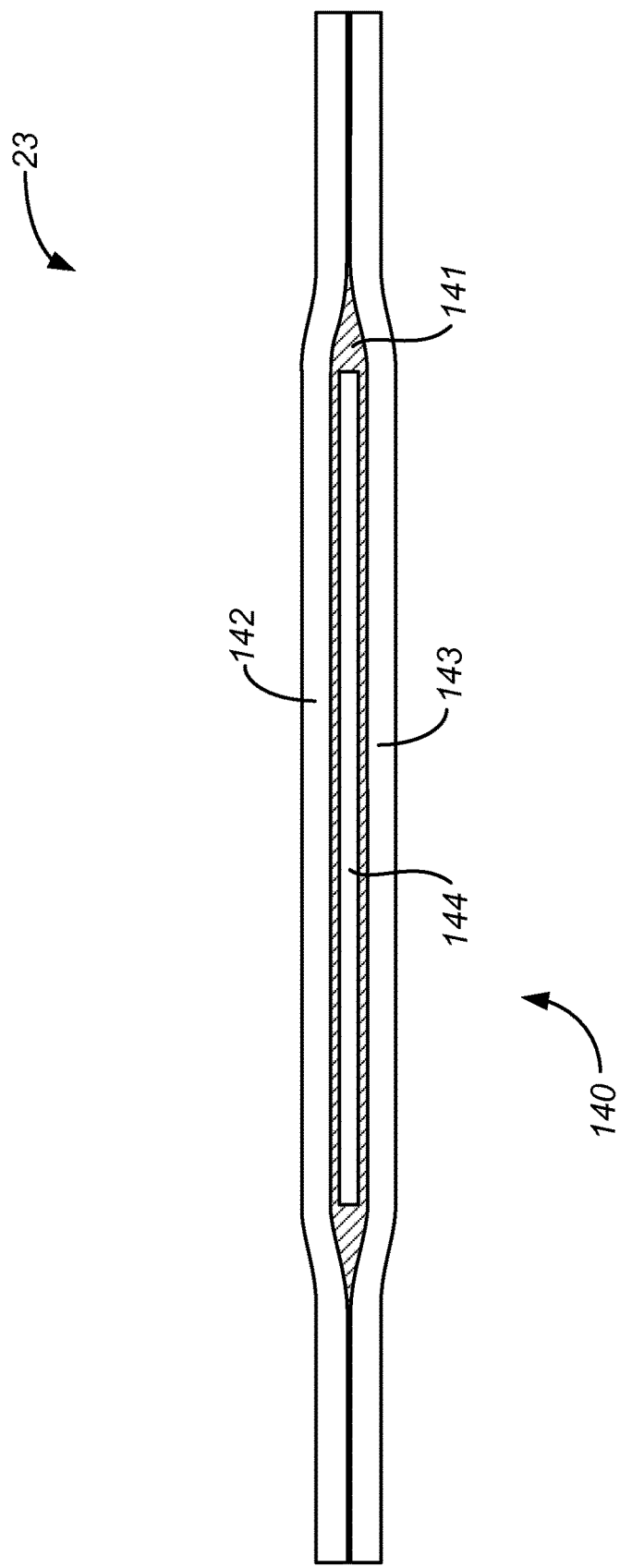
FIG. 5 depicts a media transfer assembly according to the present disclosure.

In one embodiment, the media transfer assembly 23 of the present invention include a container 140 defining one or more reservoirs 141 for containing the pigment. As illustrated in FIG. 5, the container 140 includes upper and lower container walls (142, 143) sealed against each other to define the one or more reservoirs 141. Such a configuration, for example, can provide a convenient way of positioning the pigment next to (e.g. on) the body part to be marked. In one embodiment, the marking device 3, by moving through the media transfer assembly 23, picks up the pigment and deposit the pigment on or in the substrate to be marked.

In one embodiment, the media transfer assembly 23 further includes a pigment carrier 144 on which at least a portion of the pigment is supported or impregnated. The pigment carrier 144 may be made of a matrix or solid support material. As illustrated in FIG. 5, the pigment carrier 144 is positioned between the upper and lower container walls (142, 143). Moreover, the pigment carrier 144 in some embodiments may be completely contained in the one or more reservoirs 141, i.e. excluded from the area where the upper and lower container walls (142, 143) are sealed against each other. Without wishing to be bound by any theory, it is contemplated that the exclusion of the pigment carrier 144 from the sealed area maintains the integrity of the container 140, including its water and/or oxygen transmission characteristics. Optionally, the upper and lower container walls (142, 143) are plastic plies, for example, constructed of polyethylene, ethylene vinyl acetate (EVA), or polyalkene (e.g. polyolefin) type.

The media transfer assemblies 23 suitable for the present disclosure include those which are constructed with container walls that have one or more of the following properties: conformable to a non-planer substrate (e.g. tail), high tensile such that it does not break upon pulling taut or during handling, puncturable without causing excessive wear to a marking device (e.g. needle), allows ink to be transferred (e.g. pushed through) to a substrate, has low vapor loss (i.e. low water vapor transmission rate or WVTR), has low oxygen incursion (i.e. low oxygen transmission rate or OTR), has an elasticity such that it does not leak upon repeated puncture, and is heat sealable. The media transfer assembly 23 disclosed herein may provide a useful means of positioning the pigment around a cylindrical body part such as a mouse tail.

In one embodiment, the upper and lower container walls (142, 143) may be constructed of any material that provides such properties. For example, the container walls (142, 143) may be constructed from a plastic such as a low-to-mid density polyethylene, ethylene vinyl acetate (EVA), or polyalkene (e.g. polyolefin) type.

In one embodiment, the media transfer assembly 23 is provided having pigment contained in the one or more reservoirs 141, wherein the container walls (142, 143) provide low moisture (water) vapor transmission rate (WVTR) and high oxygen transmission rate (OTR) and have the following structurally-dependent properties:

a WVTR from about 4.0 to about 6.0 gr/m$^2$/24 hr, for example, about 6.0 (as measured by the ASTM F-1249 method).

an OTR from about 3,840 to about 9,660 cc/m²/24 hrs, for example 3,840 (as measured by the ASTM D-3985 method).

an elongation modulus of about 180% to about 600%, for example, about 250% (as measured by the ASTM D882 method); and a tensile strength of about 4.4 to about 6.8 lbs/in, for example, about 5 lbs (as measured by the ASTM D-882 method);

In one embodiment, the media transfer assembly 23 is provided having pigment contained in the one or more reservoirs 141, wherein the container walls (142, 143) provide low moisture (water) vapor transmission rate (WVTR) and low oxygen transmission rate (OTR) and have the following structurally-dependent properties:

a WVTR from about 2.0 to about 6.0 gr/m²/24 hr, for example, about 2.0 (as measured by the ASTM F-1249 method).

an OTR from about 60 to about 4,000 cc/m²/24 hrs, for example 90 (as measured by the ASTM D-3985 method).

an elongation modulus of about 200% to about 600%, for example, about 250% (as measured by the ASTM D882 method); and a tensile strength of about 4.4 to about 6.0 lbs/in, for example, about 6 lbs (as measured by the ASTM D-882 method);

The media transfer assembly suitable for the present disclosure may also be constructed from other plastic materials (or other material) to provide desirable properties in light of the general teachings disclosed herein. Such properties may be dependent, for example, on the makeup or composition of a ply and the thickness of the ply. For example, container walls having a thickness of about 0.003 in. (0.076 mm or 76 microns) and constructed from polyethylene, ethylene vinyl acetate (EVA), or polyalkene (e.g. polyolefin) type may be useful to provide such a media transfer assembly.

In addition to material composition, material thickness may also contribute to the conformability of the container walls to a marking substrate. In one embodiment, a desirable characteristic is for the container wall material to conform to the geometry of the substrate (e.g. mouse tail) sufficiently as to wrap or be in contact with said substrate in those regions where the marking is to be made. In one embodiment, one or more of the container walls (142, 143) may have a thickness of about 0.003 in. (0.076 mm or 76 microns) +/−10%, 20%, or 30% and may be constructed from a polyethylene, ethylene vinyl acetate (EVA), or polyalkene (e.g. polyolefin) are useful to provide such a media transfer assembly.

Figure 55:
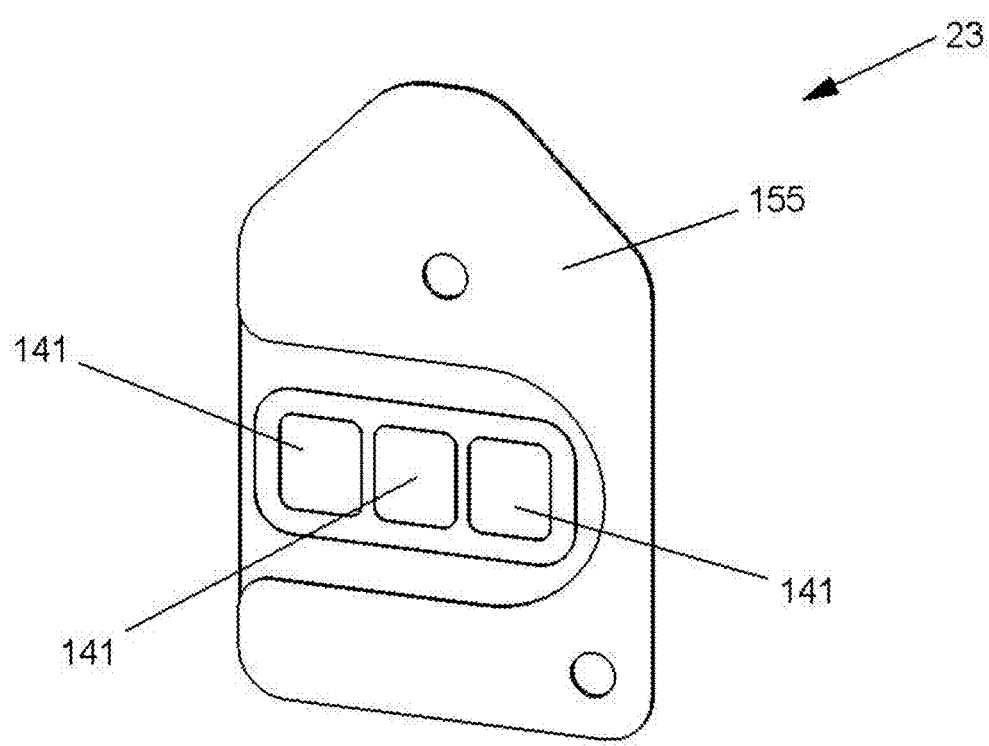
FIG. 55 depicts an exemplary media transfer assembly according to the present disclosure, particularly illustrating a multiple-reservoir pigment container

Useful media transfer assemblies include those where the container walls (142, 143) are formed and sealed in such a manner as to create a reservoir or compartment wherein the pigment is contained and where it is positionally confined generally to that region encompassing the desired substrate area to be marked (e.g. tattooed). Such a formed and sealed feature may in some embodiments be provided in the form of a singular reservoir or compartment (as illustrated in FIGS. 51-54), or it may in some embodiments be provided in the form of a plurality of reservoirs or compartments within a given media transfer assembly (as illustrated in FIG. 55).

Figure 51:
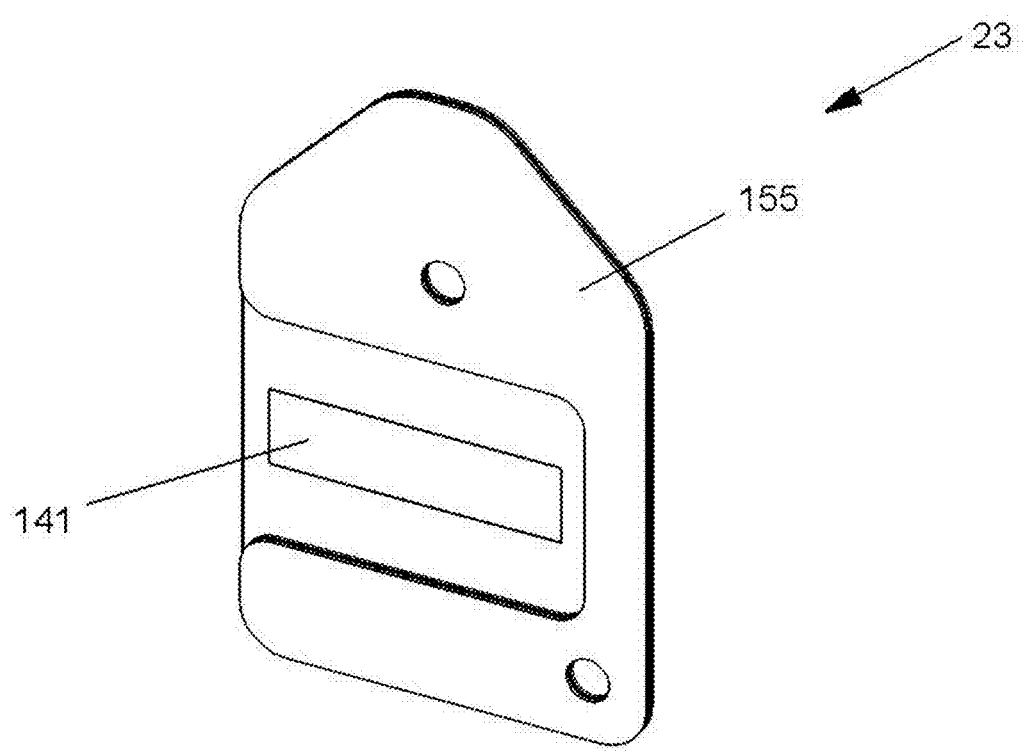
FIG. 51 depicts an exemplary media transfer assembly according to the present disclosure, particularly illustrating a single-reservoir pigment container.

Turning now to FIG. 51, in the case where the media transfer assembly provides a singular pigment reservoir or compartment 141, said reservoir 141 may be configured to share the pigment stored therein across all of the characters to be marked on the substrate. In such a case, some features may be incorporated into the reservoir 141 to prevent the pigment from either flowing freely out of the media transfer assembly 23 once pierced by the marking needle 5, or from being unequally distributed across the multiple characters to be used in the marking process. Either case results in surplus pigment in some characters and insufficient pigment in others. Surplus pigment results in unnecessary cleaning and risks compromising the quality of the marking due to smearing. Insufficient pigment results in lightness of characters and compromises legibility.

Figure 52:
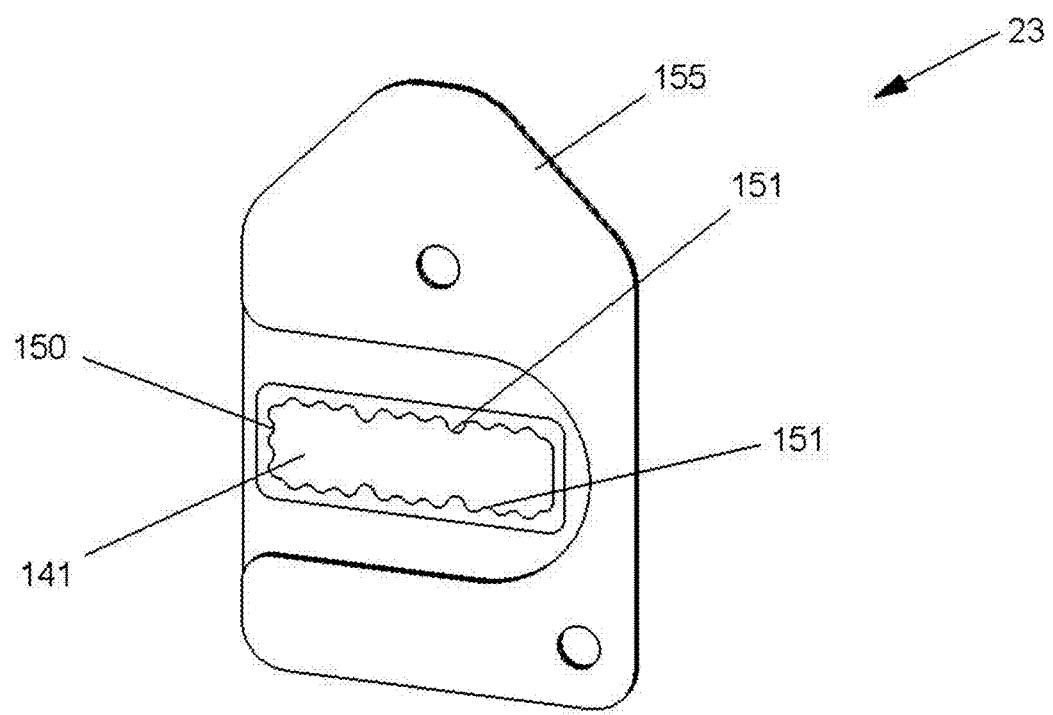
FIG. 52 depicts an exemplary media transfer assembly according to the present disclosure, particularly illustrating a single-reservoir pigment container with scalloped edge feature.
Figure 53:
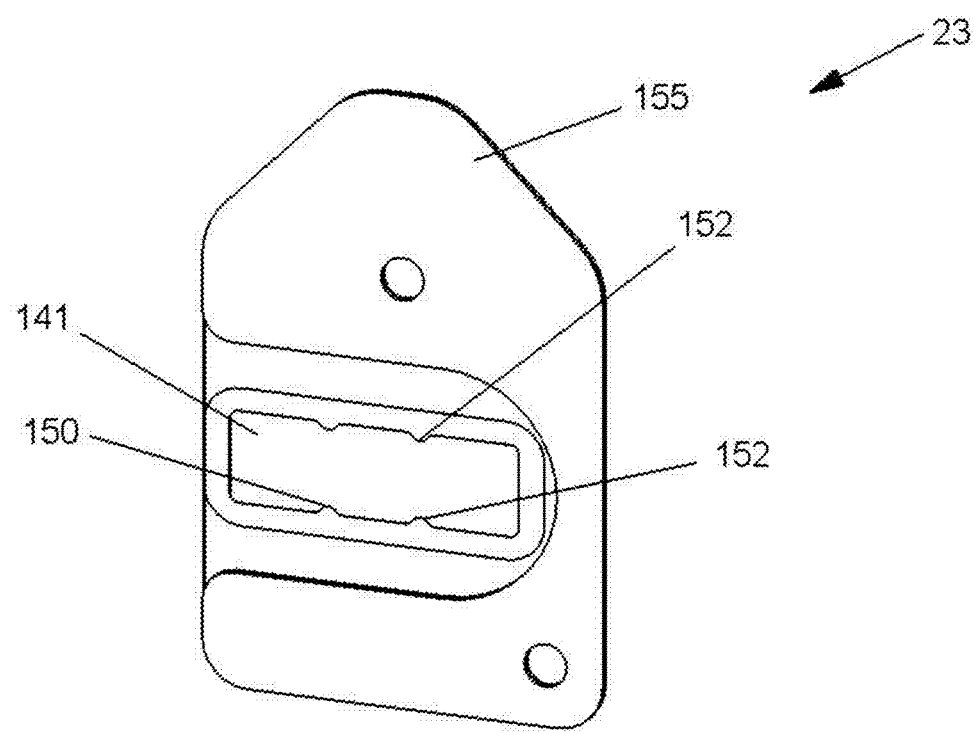
FIG. 53 depicts an exemplary media transfer assembly according to the present disclosure, particularly illustrating a single-reservoir pigment container with baffled edge feature.
Figure 54:
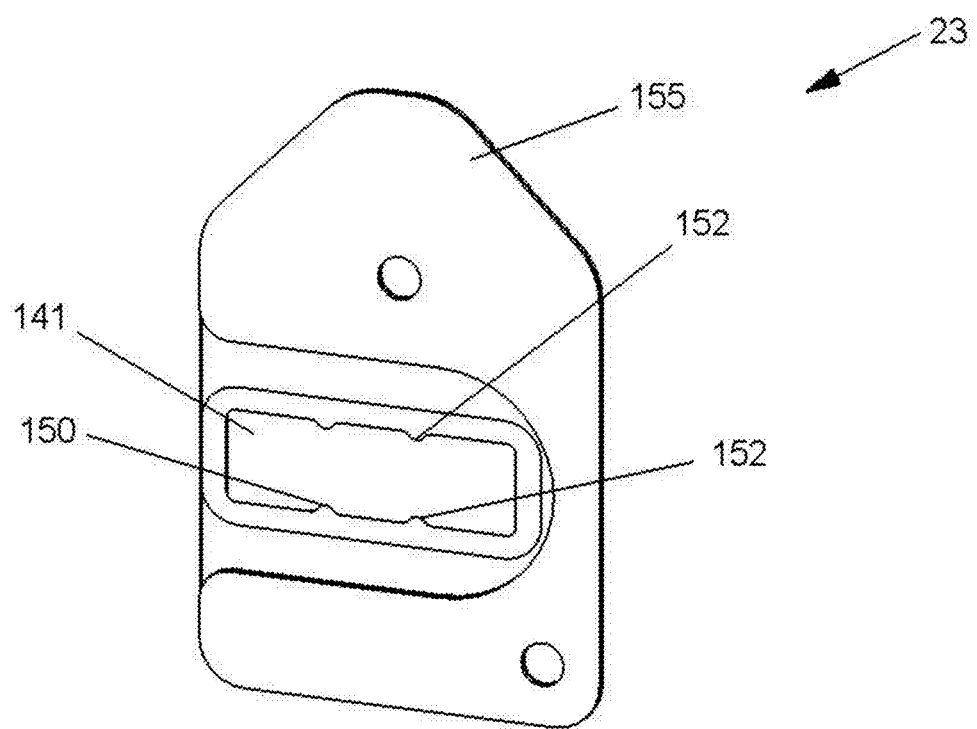
FIG. 54 depicts an exemplary media transfer assembly according to the present disclosure, particularly illustrating a single-reservoir pigment container with baffled edge feature.

Referring now to FIG. 52, the media transfer assembly 23 having a singular reservoir or compartment 141 may be formed and sealed with edge feature 150 along both sides of its interior longitudinal length that is configured to inhibit or limit pigment flow within the reservoir 141. In the embodiment illustrated in FIG. 52, the edge feature 150 includes a series of continuous undulating members 151 of either uniform or varying heights (e.g. scalloped edges). In another embodiment illustrated in FIGS. 53-54, the edge feature 150 may be provided in the form of discrete baffles 152, singularly located between each of the character marking zones. In either case, whether continuous scalloped edges or discrete baffles, such edge features 150 may still permit some communication of pigment along the longitudinal length. Stated differently, in the fabrication of the media transfer assembly 23, said edge feature 150, while limiting flow, still enable the reservoir 141 to be filled with the pigment by means of a single filling process.

In one embodiment, the media transfer assembly 23 having a singular reservoir or compartment 141 is thermoformed with a continuous pigment carrier 144 comprised of a matrix or a solid support material encapsulated within said reservoir 141 for the purpose of limiting pigment flow out of the reservoir when said reservoir is pierced by the tattoo needle, as illustrated in FIG. 5 of the present disclosure.

Optionally, the pigment carrier 144 is confined to only within the reservoir or compartment 141 wherein the pigment is contained. As a result, the pigment carrier does not extend into or encroach upon the formed and sealed areas that form the reservoir 141 and that may otherwise be compromised, permitting air to seep in or fluid to seep out, thus accelerating drying of the pigment within.

In one embodiment, the pigment carrier 144 is a matrix or a solid support material that is non-absorbing or pigment-philic, and the pigment is dispensed into the reservoir between the pigment carrier 144 and the lower container wall (143) of the media transfer assembly (i.e. the proximal side nearest to the substrate to be marked). Using a non-absorbing carrier has the effect of concentrating the pigment nearest the region to be marked and minimizes excess pigment from flowing out of the side opposite (i.e. the distal side of the media transfer assembly where the tattoo needle enters) where it serves no purposes and results in additional cleaning on the part of the user.

Optionally, the pigment carrier 144 may in some embodiments be treated with a coating or lamination to achieve the non-absorbing or pigment-philic properties.

Turning to FIG. 55, in the case where the media transfer assembly 23 includes a plurality of reservoirs or compartments 141, said reservoirs 141 may be each dedicated to the character to be marked on the substrate. Alternatively, said reservoirs 141 could be limited to one or more, but not all of the characters to be marked on the substrate. The plurality of reservoirs may help to mitigate premature flow of the pigment out of reservoir 141 once it is pierced in all but the character(s) being marked at the time.

Regardless of the process used to form the pigment-containing reservoirs, the seal around said compartments should have sufficient strength to withstand internal and external pressure without rupturing. In one embodiment, the container 140 is capable of withstanding an internal air pressure of up to at least 25 psi without failure or rupturing, and/or withstanding an external load of up to at least 20 psi without failure or rupturing. It is contemplated that meeting these criteria may help to prevent external leaking out of or internal communication of the pigment between the plurality of reservoirs.

In one embodiment, the media transfer assembly 23 further includes a rigid or semi-rigid frame 155 to which the pigment-filled container 140 may in some embodiments be affixed for purposes of handling and providing alignment features used to repeatably position said container 140 with respect to the animal marking system.

Optionally, the rigid or semi-rigid frame 155 may in some embodiments be made of either a polymer or a paper-based (e.g. cardstock) material. In one embodiment, the pigment-filled container 140 may be either layered between top and bottom halves each having a thickness of or about 0.010", or it may in some embodiments affixed to atop or beneath a singular frame having a thickness of or about 0.020".

In the case where the marking needle 5 is reused for marking animals, it is often desirable to clean the marking needle 5 between each animal, or between cages, or between x number of animals. Cleaning serves at least two purposes, namely to prevent cross-contamination between animals, and to keep the needle tip from progressively accumulating pigment. The pigment that would otherwise build-up, prevents proper penetration of the needle, and hence deposition into the appropriate dermal layer depth.

In one embodiment, a media transfer assembly 23 may be solely dedicated to the purpose of cleaning the marking needle, and comprises one or more reservoirs that are filled with a cleaning solution instead of pigment.

Optionally, a media transfer assembly 23 may in some embodiments be designed to be dual function, with one or more reservoirs 141 that are dedicated to cleaning, while the remaining reservoirs 141 are filled with pigment and used for marking.

The type of cleaning solution that might be efficacious in cleaning the marking needle 5 is largely dependent upon the base or carrier material used in the pigment solution—whether oil, water, or solvent-based.

In one embodiment, the cleaning solution is a mineral oil, alcohol, or aqueous based solution commensurate with a pigment whose base or carrier is oil, water, or solvent-based respectively.

Marking substrates (e.g. animal tails) that have light pigmentation can be readily marked and easily read using black pigment. High contrast between the substrate and the pigment coloring enhances legibility. For many studies, animals of a specific genetic make-up or genetic proclivity are desirable. Many mouse strains of genetic interest have darker coats and heavily pigmented tails. Legibility of a dark tattoo on a heavily pigmented tail is significantly compromised. In this case, achieving legibility of a sufficient contrast between the substrate (e.g. tail) and the identification marking requires additional coloration of the pigment in the visible light spectrum and/or coloration of the pigment in the UV light spectrum. In the latter case, the legibility of the marking is greatly enhanced with the assistance of a UV light.

In one embodiment, the media transfer assembly 23 comprises a pigment with a color that is solely or in combination, black and/or colored in the visible light spectrum, or colored in the UV spectrum. Optionally the pigment is:

d. Black in the visible light spectrum, i.e. about 390-750 nm wavelength.
  e. Colored in the visible light spectrum, i.e. about 390-750 nm wavelength.
  f. Transparent in the visible light spectrum, i.e. about 390-750 nm wavelength—and colored in the UV spectrum, i.e. about 10-400 nm wavelength.
  g. Colored in the visible light spectrum, i.e. about 390-750 nm wavelength, and colored in the UV spectrum, i.e. about 10-400 nm wavelength.
  h. Black in the visible light spectrum, i.e. about 390-750 nm wavelength, and colored in the UV spectrum, i.e. about 10-400 nm wavelength.

Besides depositing the pigment into the appropriate depth of the dermal layer, one of the factors in achieving a durable tattoo marking is to ensure that the pigment remains at the depth where it is placed. If the particle size of the pigment is too small (e.g. <1.0 micron) it may migrate into the sub-dermal vascularized layers of the hypodermis where interstitial fluids enable the pigment it to migrate thus resulting in markings that are either too light to read (i.e. lack of pigment concentration), and/or whose characters are increasingly blurred and occluded over time thereby diminishing legibility. Further, pigments that have a proclivity to migrate within the substrate may eventually make their way into lymphatic system and taint the results of the very study that the animal was selected for. Thus, in some embodiment, using pigment particles of greater than 1.0 micron mitigates migration within the substrate.

Figure 56:
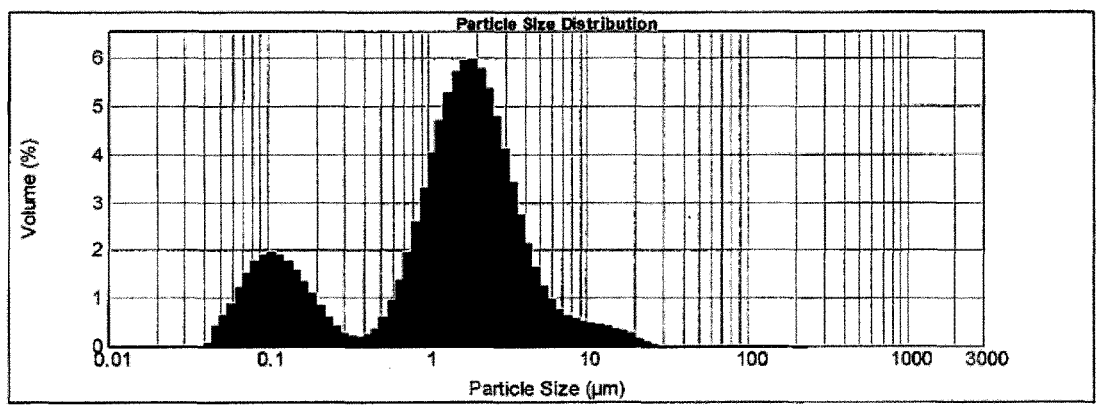
FIG. 56 depicts particle size distribution of an exemplary pigment according to the present disclosure.

Turning now to FIG. 56, a laser diffraction measurement of the particle size distribution of a conventional tattoo pigment is shown as including two humps where the smaller particle size, centered about 0.1 microns, is indicative of the pigment particle size, and the larger particle size, centered about 1.8 microns is indicative of agglomerates of the pigment particles.

Using pigment that has relatively large particles may be perceived as contrary to traditional ink pigment preparation and selection where pigment size and pigment size distribution are often exposed to ultrasonic cavitation to keep particle size small and distribution uniform.

For example, pigments with too large a particle size, or agglomerates of sufficient particle size, or a combination of the two can lead to dispersion instability, sedimentation, or nozzle failure in the dispense process used to package the pigment into a media transfer assembly. Using pigment particles and/or agglomerates of less than 10.0 microns mitigates the dispersion, sedimentation, or clogging concerns.

In one embodiment, the media transfer assembly comprises a pigment having a particle size that is in the range of between 1.0-10.0 microns, inclusive of agglomerates.

Optionally, the particle size may be greater than 10.0 microns.

The type of materials used in pigments and powders are often dependent on the desired size and/or color. In laboratory studies, it is also desired that the material used as a marking pigment not influence the study result. To this end, in addition to remaining where they are applied, pigments suitable for use in some embodiments of the present disclosure may be bio-compatible. To reduce pigment material incompatibility, the pigment may in some embodiments be encapsulated in translucent polymer microspheres. The encapsulation may improve bio-compatibility, while the translucent polymer maintains visibility of the mark to be made. Further, control of the desired particle size may be transferred from the pigment to a microsphere that can be fabricated and sieved appropriately.

Figure 57:
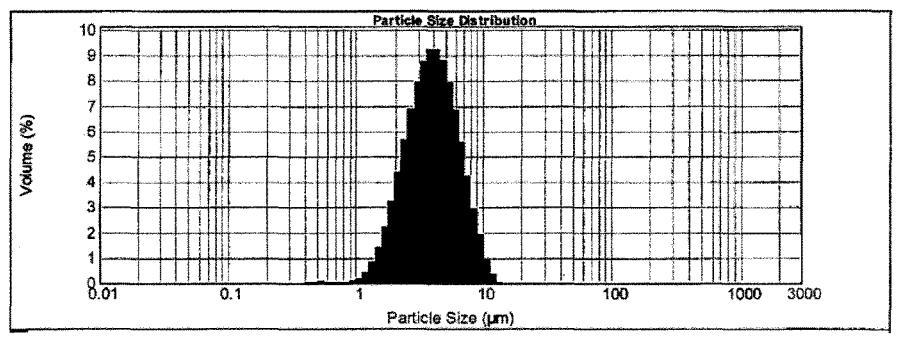
FIG. 57 depicts particle size distribution of an exemplary pigment according to the present disclosure.

Turning now to FIG. 57, a laser diffraction measurement of the particle size distribution of a pigment encapsulated within a polymer microsphere is characterized as a single hump distribution. The individual microspheres may be sieved (sized) to fall within 1.0-5.0 microns in some embodiments. The fact that the distribution extends up to 10.0 microns may be attributed to some agglomerating of the microspheres themselves.

In one embodiment, the media transfer assembly 23 comprises a pigment that is encapsulated in translucent polymer microspheres;

Optionally, the polymer material is a bio-compatible poly(methyl 2-methylpropenoate) or poly(methyl methacrylate) (PMMA) that is approved by the U.S. FDA (Food and Drug Administration for industrial/commercial applications.

Optionally, the media transfer assembly 23 comprises translucent polymer microspheres having a particle size that is in the range of between 1.0-10.0 microns, inclusive of agglomerates.

Optionally, the encapsulated pigment particle size is less than 1.0 micron.

Optionally, the encapsulated pigment particle size is less than 10.0 microns.

In one embodiment, the media transfer assembly 23 uses translucent polymer microspheres to encapsulate a pigment that is solely or in combination, black and/or colored in the visible light spectrum, or colored in the UV spectrum. Optionally the pigment is:
  i. Black in the visible light spectrum, i.e. about 390-750 nm wavelength.
  j. Colored in the visible light spectrum, i.e. about 390-750 nm wavelength.
  k. Transparent in the visible light spectrum, i.e. about 390-750 nm wavelength—and colored in the UV spectrum, i.e. about 10-400 nm wavelength.
  l. Colored in the visible light spectrum, i.e. about 390-750 nm wavelength, and colored in the UV spectrum, i.e. about 10-400 nm wavelength.
  m. Black in the visible light spectrum, i.e. about 390-750 nm wavelength, and colored in the UV spectrum, i.e. about 10-400 nm wavelength.
  n. Comprised of a unique spectral signature resulting from mixing microspheres having black and/or different colored pigments.

While only certain embodiments have been set forth, alternative embodiments and various modifications will be apparent from the above descriptions to those skilled in the art. These and other alternatives are considered equivalents and within the spirit and scope of this disclosure.

What is claimed is:

1. A marking system comprising:
  at least one restraining device, a controller, and a marking device wherein:
  a. the at least one restraining device is sized and configured for restraining an animal or animal body part thereof and oriented such that the marking device can make a mark on a marking substrate of the animal body part;
  b. the controller is configured to control a position of the marking device and to operate the marking device to make a mark on the marking substrate of the animal body part; and
  c. the marking device comprises a marking needle of fixed length comprising a plurality of needle tips; wherein the plurality of needle tips comprises multiple coplanar tips having a tip length deviation of no more than about ±0.001" (±25 microns) and a tip concentration deviation of no more than about ±0.005" (±125 microns);
  d. the animal is a mouse, a rat, or a rodent; and
  e. the body part is a tail.

2. The marking system of claim 1, wherein the marking needle is coupled to a needle cartridge.

3. The marking system of claim 2, wherein the needle cartridge comprises a reference feature configured to position the needle cartridge on the marking device with precision.

4. The marking system of claim 2, wherein the needle cartridge is removable to allow replacement of worn or damaged marking needles.

5. The marking system of claim 2, wherein the marking device comprises multiple needle cartridges dimensioned to account for differences in animal substrate size or geometry.

6. The marking system of claim 1, wherein the plurality of needle tips are configured to penetrate an epidermis of the marking substrate and transfer a pigment into the epidermis of the marking substrate.

7. The marking system of claim 6, wherein the pigment is configured to be deposited into the marking substrate of a young mouse at a depth of about 150-250 microns.

8. The marking system of claim 6, wherein the pigment is configured to be deposited into the marking substrate of an adult mouse at a depth of about 200-300 microns.

9. The marking system of claim 6, wherein the pigment is configured to be deposited into the marking substrate of a mouse at a depth of about 200-250 microns.

10. The marking system of claim 1, wherein the restraining device comprises a spring-loaded tapered v-groove configured to compensate for differences in size of the marking substrate.

11. The marking system of claim 10, wherein the spring-loaded tapered v-groove is modulated to compensate for differences in size of the marking substrate of the animal body part.

12. The marking system of claim 11, wherein the spring-loaded tapered v-groove comprises a plurality of independent groove sections, each independent groove section being articulating and self-aligning.

13. The marking system of claims 10, wherein the marking system is configured to select a length of the marking needle and a configuration of the restraining device based on a size of the marking substrate.

14. The marking system of claim 1, further comprising a media transfer assembly comprising a pigment, wherein the marking device is configured to make a mark by contacting the pigment prior to the marking substrate.

15. The marking system of claim 14, wherein the media transfer assembly comprises a container defining one or more reservoirs for containing the pigment, wherein the container comprises upper and lower container walls sealed against each other to define the one or more reservoirs, and optionally, each of the upper and lower container walls comprise a polymer material.

16. The marking system of claim 15, wherein the pigment is contained within the one or more reservoirs in the container.

17. The marking system of claim 15, further comprising a rigid or semi-rigid frame configured to secure and support the container.

18. The marking system of claim 15, wherein at least one of the one or more reservoirs is filled with a cleaning solution adapted to clean the marking needle.

19. The marking system of claim 14, wherein the pigment is selected from the group consisting of:
   a. pigments that are black in the visible light spectrum of about 390-750 nm wavelength,
   b. pigments that are colored in the visible light spectrum of about 390-750 nm wavelength,
   c. pigments that are transparent in the visible light spectrum of about 390-750 nm wavelength; and are colored in the UV spectrum of about 10-400 nm wavelength,
   d. pigments that are colored in the visible light spectrum of about 390-750 nm wavelength; and are colored in the UV spectrum of about 10-400 nm wavelength,
   e. pigments that are black in the visible light spectrum of about 390-750 nm wavelength;
      and are colored in the UV spectrum of about 10-400 nm wavelength.

20. The marking system of claim 14, wherein the pigment has an average particle size in the range of between 1.0-10.0 microns, inclusive of agglomerates.

21. The marking system of claim 14, wherein the pigment is encapsulated in polymer micro spheres.

22. The marking system of claim 21, wherein the polymer microspheres have an average particle size in the range of between 1.0-10.0 microns, inclusive of agglomerates.

23. The marking system of claim 21, wherein the polymer microspheres have an optical characteristic selected from the group consisting of:
   a. Black in the visible light spectrum of about 390-750 nm wavelength,
   b. Colored in the visible light spectrum of about 390-750 nm wavelength,
   c. Transparent in the visible light spectrum of about 390-750 nm wavelength—and colored in the UV spectrum of about 10-400 nm wavelength,
   d. Colored in the visible light spectrum of about 390-750 nm wavelength, and colored in the UV spectrum of about 10-400 nm wavelength,
   e. Black in the visible light spectrum of about 390-750 nm wavelength, and colored in the UV spectrum of about 10-400 nm wavelength, and
   f. combinations thereof.

* * * * *

UNITED STATES PATENT AND TRADEMARK OFFICE
CERTIFICATE OF CORRECTION

PATENT NO. : 9,700,016 B2
APPLICATION NO. : 13/869883
DATED : July 11, 2017
INVENTOR(S) : Gandola et al.

It is certified that error appears in the above-identified patent and that said Letters Patent is hereby corrected as shown below:

On the Title Page

Column 1, Item (72), under "Inventors:", Line 3, delete "Mark" and insert -- Marc --.

On Page 2, Column 1, Item (51), under "Int. Cl.", Lines 1-3,
    *A01K 11/00*    (2006.01)
    *A01K 1/03*    (2006.01)
delete " *A01K 1/06*    (2006.01)".

On Page 2, Column 2, Item (56), under "FOREIGN PATENT DOCUMENTS", Line 8,
    WO    WO 2013/163339    10/2013
delete "WO    WO2013163339    10/2013" and
insert -- WO    WO 2013/163339    10/2013 --, therefor.

In the Claims

In Column 25, Line 67, Claim 1, delete "part; and" and insert -- part; --, therefor.

In Column 26, Line 47, Claim 13, delete "claims" and insert -- claim --, therefor.

In Column 28, Line 9, Claim 23, delete "Black" and insert -- black --, therefor.

In Column 28, Line 11, Claim 23, delete "Colored" and insert -- colored --, therefor.

In Column 28, Line 13, Claim 23, delete "Transparent" and insert -- transparent --, therefor.

In Column 28, Line 16, Claim 23, delete "Colored" and insert -- colored --, therefor.

In Column 28, Line 19, Claim 23, delete "Black" and insert -- black --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*